(12) United States Patent
Ricard et al.

(10) Patent No.: US 12,190,451 B2
(45) Date of Patent: Jan. 7, 2025

(54) PROCESSING A POINT CLOUD

(71) Applicant: InterDigital CE Patent Holdings, SAS, Paris (FR)

(72) Inventors: Julien Ricard, Plouër-sur-Rance (FR); Joan Llach Pinsach, London (GB); Pierre Andrivon, Liffre (FR); Jean-Claude Chevet, Betton (FR); Celine Guede, Cesson Sevigne (FR); Yannick Olivier, Thorigne Fouillard (FR)

(73) Assignee: INTERDIGITAL CE PATENT HOLDINGS, SAS, Paris (FR)

( * ) Notice: Subject to any disclaimer, the term of this patent is extended or adjusted under 35 U.S.C. 154(b) by 6 days.

(21) Appl. No.: 17/440,891

(22) PCT Filed: Feb. 25, 2020

(86) PCT No.: PCT/EP2020/054819
§ 371 (c)(1),
(2) Date: Sep. 20, 2021

(87) PCT Pub. No.: WO2020/193038
PCT Pub. Date: Oct. 1, 2020

(65) Prior Publication Data
US 2022/0172433 A1    Jun. 2, 2022

(30) Foreign Application Priority Data

Mar. 22, 2019  (EP) ..................................... 19305361
Jul. 1, 2019   (EP) ..................................... 19305895
(Continued)

(51) Int. Cl.
*G06T 17/20*     (2006.01)
*G06T 5/70*      (2024.01)
*G06T 11/60*     (2006.01)

(52) U.S. Cl.
CPC .............. *G06T 17/205* (2013.01); *G06T 5/70* (2024.01); *G06T 11/60* (2013.01); *G06T 2207/10028* (2013.01)

(58) Field of Classification Search
CPC ......... G06T 17/205; G06T 9/20; G06T 5/002; G06T 11/60; G06T 2207/10028;
(Continued)

(56) References Cited

U.S. PATENT DOCUMENTS 9,858,670 B2    1/2018  Nakazato et al.
10,110,914 B1*  10/2018 Chen ...................... H04N 19/54
(Continued)

FOREIGN PATENT DOCUMENTS

EP    3713238 A1    9/2020
JP    2016075637 A  5/2016
(Continued)

OTHER PUBLICATIONS

Anonymous, "High Efficiency Video Coding", Series H: Audiovisual and Multimedia Systems, Infrastructure of Audiovisual Services—Coding of Moving Video, International Telecommunication Union (ITU), Recommendation ITU-T H.265, Feb. 2018, 692 pages.
(Continued)

*Primary Examiner* — Phi Hoang
(74) *Attorney, Agent, or Firm* — VOLPE KOENIG

(57) ABSTRACT

At least one embodiment relates to a method for smoothing (filtering) the geometry of a point cloud frame by performing an analysis and filtering of said geometry point cloud in a 2D space, without reconstruction of 3D samples in a 3D space, and by using a flexible filtering operator that, in addition to moving existing points, can also remove points or add new ones.

19 Claims, 24 Drawing Sheets

(30) Foreign Application Priority Data

Sep. 24, 2019 (EP) .................................... 19306189
Oct. 4, 2019 (EP) .................................... 19306291

(58) Field of Classification Search
CPC ........... G06T 9/001; G06T 9/00; H04N 19/86; H04N 19/14; H04N 19/186; H04N 19/20; H04N 19/82; H04N 19/597
See application file for complete search history.

(56) References Cited

U.S. PATENT DOCUMENTS

| | | | |
|---|---|---|---|
| 2019/0087978 A1 | 3/2019 | Tourapis et al. | |
| 2019/0087979 A1* | 3/2019 | Mammou | H04N 19/597 |
| 2019/0139266 A1* | 5/2019 | Budagavi | G06T 9/001 |
| 2019/0392651 A1* | 12/2019 | Graziosi | G06T 13/20 |
| 2020/0020133 A1* | 1/2020 | Najaf-Zadeh | G06T 3/40 |
| 2020/0043121 A1* | 2/2020 | Boyce | G06T 15/005 |
| 2020/0107028 A1* | 4/2020 | Vosoughi | H04N 19/167 |
| 2021/0217139 A1 | 7/2021 | Yano et al. | |
| 2023/0134675 A1* | 5/2023 | Ilola | H04N 19/463 725/86 |

FOREIGN PATENT DOCUMENTS

| | | |
|---|---|---|
| JP | 2018194891 A | 12/2018 |
| WO | WO 2019142164 A1 | 7/2019 |
| WO | 2020012967 A1 | 1/2020 |

OTHER PUBLICATIONS

Hoppe et al., "Surface Reconstruction from Unorganized Points", SIGGRAPH '92: Proceedings of the 19th Annual Conference on Computer Graphics and Interactive Techniques, Jul. 1992, 8 pages.

Najaf-Zadeh et al., "[PCC] On complexity reduction of geometry smoothing in TMC2", International Organization for Standardization, ISO/IEC JTC1/SC29/WG11, Coding of Moving Picture and Audio, Document MPEG2018/m43722, Ljubljana, Slovenia, Jul. 2018, 5 pages.

Nakagami et al., "PCC Core Experiment 2.17 on color and geometry smoothing", International Organization for Standardization, ISO/IEC JTC1/SC29/WG11, Coding of Moving Picture and Audio, Document N17870, Ljubljana, Slovenia, Jul. 2018, 5 pages.

Mammou (Ed.), "PCC Test Model Category 2 v0", International Organization for Standardization, ISO/IEC JTC1/SC29/WG11, Coding of Moving Picture and Audio, Document N17248, Macau, China, Oct. 2017, 11 pages.

Mammou et al., Study Text of ISO/IEC CD 23090 5: Video-based Point Cloud Compression, International Organization for Standardization, ISO/IEC JTC1/SC29/WG11, Coding of Moving Picture and Audio, Document N18180, Jan. 2019, Marrakesh, Morocco, 103 pages.

Anonymous, "Information Technology—Generic Coding of Moving Pictures and Associated Audio" International Organization for Standardization, ISO/IEC JTC1/SC29/WG11, Coding of Moving Picture and Associated Audio, Document N0702rev. Mar. 25, 1994, 212 pages.

Anonymous, "Information Technology—Coded Representation of Immersive Media—Part 5: Video-based Point Cloud Compression", International Organization for Standardization, ISO/IEC 23090-5:2018(E), 2018, 232 pages.

Zakharchenko et al., "V-PCC Codec Description", International Organization for Standardization, ISO/IEC JTC1/SC29/WG11, Document N18017, Macau, China, Oct. 2018, 33 pages.

Zakharchenko, Vladyslav, "Algorithm Description of MPEG-PCC-TMC2", International Organization for Standardization, ISO/IEC JTC1/SC29/WG11, Document: MPEG2018/N1776, Ljubljana, Slovenia, Jul. 2018, 22 pages.

Ricard et al., "[V-PCC] [New] Patch Border Filtering", International Organization for Standardization, ISO/IEC JTC1/SC29/WG11, Coding of Moving Picture and Audio, Document MPEG2018/m47479, 126th Meeting, Geneva, Switzerland, Mar. 2019, 6 pages.

\* cited by examiner

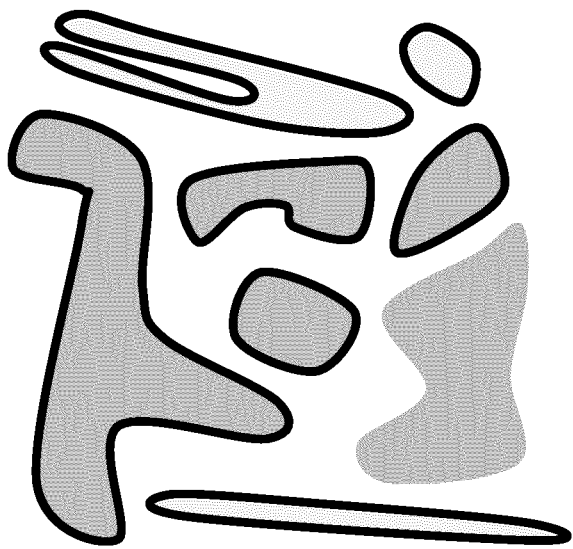
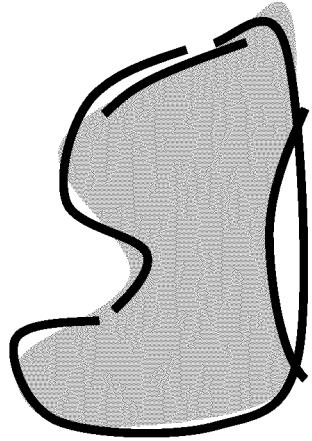
Fig. 8a	Fig. 8b
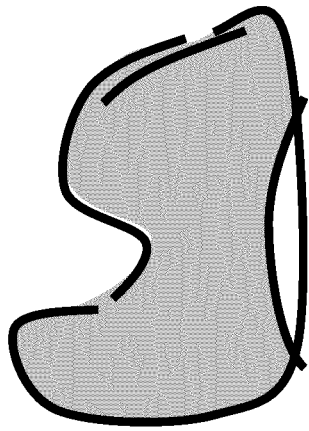
Fig. 8c	Fig. 8d

Example of occupancy map contour (left) and 2D pattern used to extract the orientations and the corresponding normals (right).

2100

2110
represent the one or more attributes of the point cloud by a canvas of patches of 2D samples and values of the 2D samples;

2120
modify at least one 2D sample of a current patch to fit a reference contour, the reference contour being obtained by re-projecting at least one 2D sample of at least one neighboring patch of the current patch to a projection plane on which the 2D samples of the current patch have been projected 2130
filter the one or more attributes of the point cloud based on the modified at least one 2D sample of the current patch

Fig. 21

PROCESSING A POINT CLOUD

This application claims the benefit, under 35 U.S.C. § 371 of International Application PCT/EP2020/054819, filed Feb. 25, 2020, which was published in accordance with PCT Article 21(2) on Oct. 1, 2020, in English, and which claims the benefit of European Patent Application No. 19305361.8, filed Mar. 22, 2019; European Patent Application No. 19305895.5, filed Jul. 1, 2019; European Patent Application No. 19306189.2, filed Sep. 24, 2019; and European Patent Application No. 19306291.6, filed Oct. 4, 2019.

TECHNICAL FIELD

At least one of the present embodiments relates generally to a processing of a point cloud.

BACKGROUND

The present section is intended to introduce the reader to various aspects of art, which may be related to various aspects of at least one of the present embodiments that is described and/or claimed below. This discussion is believed to be helpful in providing the reader with background information to facilitate a better understanding of the various aspects of at least one embodiment.

Point clouds may be used for various purposes such as culture heritage/buildings in which objects like statues or buildings are scanned in 3D in order to share the spatial configuration of the object without sending or visiting it. Also, it is a way to ensure preserving the knowledge of the object in case it may be destroyed; for instance, a temple by an earthquake. Such point clouds are typically static, colored and huge.

Another use case is in topography and cartography in which using 3D representations allows for maps that are not limited to the plane and may include the relief. Google Maps is now a good example of 3D maps but uses meshes instead of point clouds. Nevertheless, point clouds may be a suitable data format for 3D maps and such point clouds are typically static, colored and huge.

The automotive industry and the autonomous car are also domains in which point clouds may be used. Autonomous cars should be able to "probe" their environment to make good driving decisions based on the reality of their immediate neighbors. Typical sensors like LIDARs (LIght Detection And Ranging) produce dynamic point clouds that are used by a decision engine. These point clouds are not intended to be viewed by a human being and they are typically small, not necessarily colored, and dynamic with a high frequency of capture. These point clouds may have other attributes like the reflectance provided by the LIDAR as this attribute provides good information on the material of the sensed object and may help in making decisions.

Virtual Reality and immersive worlds have become hot topics recently and are foreseen by many as the future of 2D flat video. The basic idea is to immerse the viewer in an environment that surrounds the viewer, in contrast to a standard TV in which the viewer can only look at the virtual world in front of the viewer. There are several gradations in the immersivity depending on the freedom of the viewer in the environment. A point cloud is a good format candidate for distributing Virtual Reality (VR) worlds.

It is important in many applications to be able to distribute dynamic point clouds to an end-user (or store them in a server) by consuming only a reasonable amount of bitrate (or storage space for storage applications) while maintaining an acceptable or improved quality of experience. Efficient compression of these dynamic point clouds is a key point in order to make the distribution chain of many immersive worlds practical.

At least one embodiment has been devised with the foregoing in mind.

SUMMARY

The following presents a simplified summary of at least one of the present embodiments in order to provide a basic understanding of some aspects of the present disclosure. This summary is not an extensive overview of an embodiment. It is not intended to identify key or critical elements of an embodiment. The following summary merely presents some aspects of at least one of the present embodiments in a simplified form as a prelude to the more detailed description provided elsewhere in the document.

According to a general aspect of at least one embodiment, there is provided a method for filtering 2D samples of a patch comprising modifying spatially at least one of said 2D samples to fit a reference contour obtained by re-projecting at least one 2D sample of at least one neighboring patch of the patch onto a projection plane on which said 2D samples of the patch have been projected.

In one embodiment, obtaining said at least one neighboring patch from at least one candidate patch.

In one embodiment, a candidate patch is a neighboring patch of the patch when 3D samples corresponding to 2D samples of said candidate patch and 3D samples corresponding to said neighboring patch are close to each other.

In one embodiment, a candidate patch is a neighboring patch of the patch when a 3D bounding box of a candidate patch intersects a 3D bounding box of the patch.

In one embodiment, the 2D samples of the patch forms a contour of said patch.

In one embodiment, the contour of the patch is modified by adding and/or removing at least one 2D sample of the patch.

In one embodiment, a 2D sample of the contour of the patch is modified if it is either inside or outside the reference contour.

In one embodiment, the contour of the patch is modified by relocating at least one 2D sample of the patch along a projection axis of the patch.

In one embodiment, the contour of the patch is modified by adding at least one additional 3D sample between at least one 3D sample corresponding to a 2D sample of the patch and at least one 3D sample corresponding to a 2D sample of the reference contour.

In one embodiment, the method further comprises filtering attributes of said 2D samples of the patch.

In one embodiment, attributes of said 2D samples of the patch comprises color information or depth information.

According to other general aspects of at least one embodiment, there is provided an apparatus, a computer program product and a non-transitory computer-readable medium.

One or more general aspects of at least one embodiment also provide a device, a computer program product and a non-transitory computer readable medium.

The specific nature of at least one of the present embodiments as well as other objects, advantages, features and uses of at least one of the present embodiments will become evident from the following description of examples taken in conjunction with the accompanying drawings.

In the example of FIG. 8a, the current patch p is depicted in gray with no outline, whereas candidate patches CAN (p) are marked with a black outline.

In the example of FIG. 8b, the current patch p is shown (gray) along with the reprojected 2D samples of its four neighboring patches (black lines).

In FIG. 8c, some areas (at least one 2D sample) of the current patch p may then be removed (top-right) while others may be added (bottom-left) compared to the patch of FIG. 8b. FIG. 8d illustrates the current patch p once modified.

Figure 9:
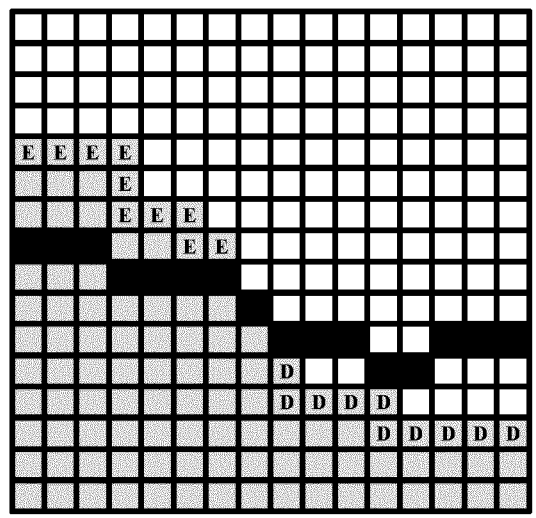
Figure 9:
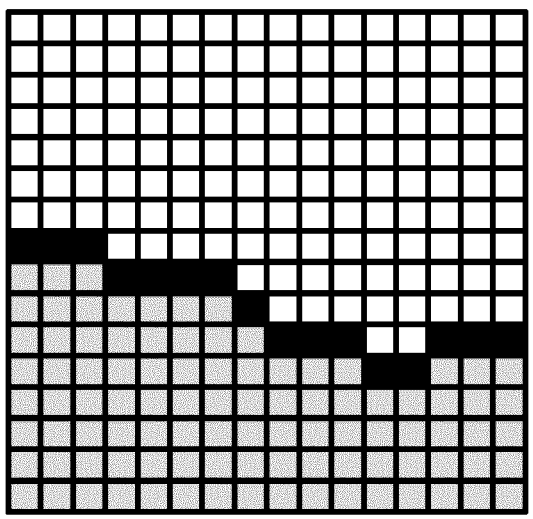
Figure 9:
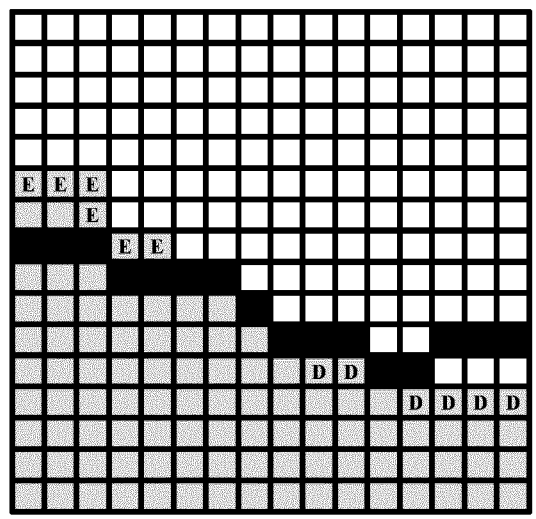

FIG. 9 illustrates an example of contour fitting by recursively eroding/dilating 2D samples of a contour C (p) based on their locations with respect to the reference contour RC (p).

Figure 10:
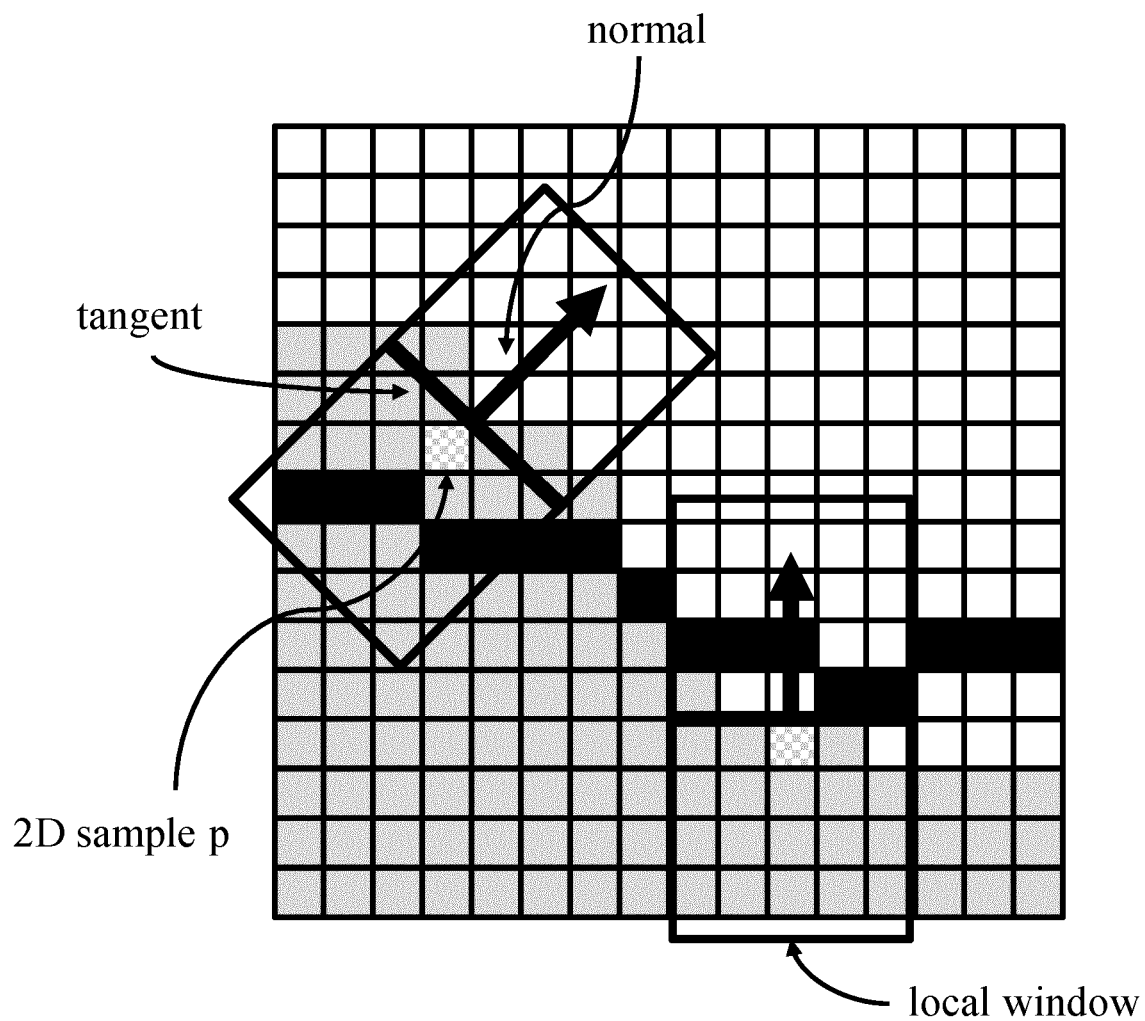

FIG. 10 illustrates a variant of the embodiment of sub-step 7031.

Figure 11:
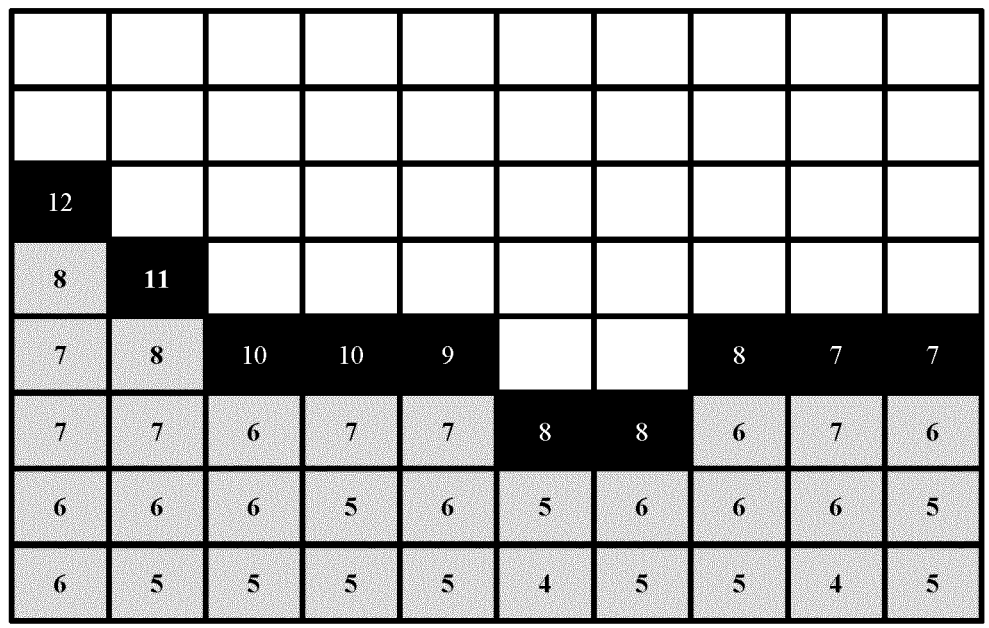
Figure 11:
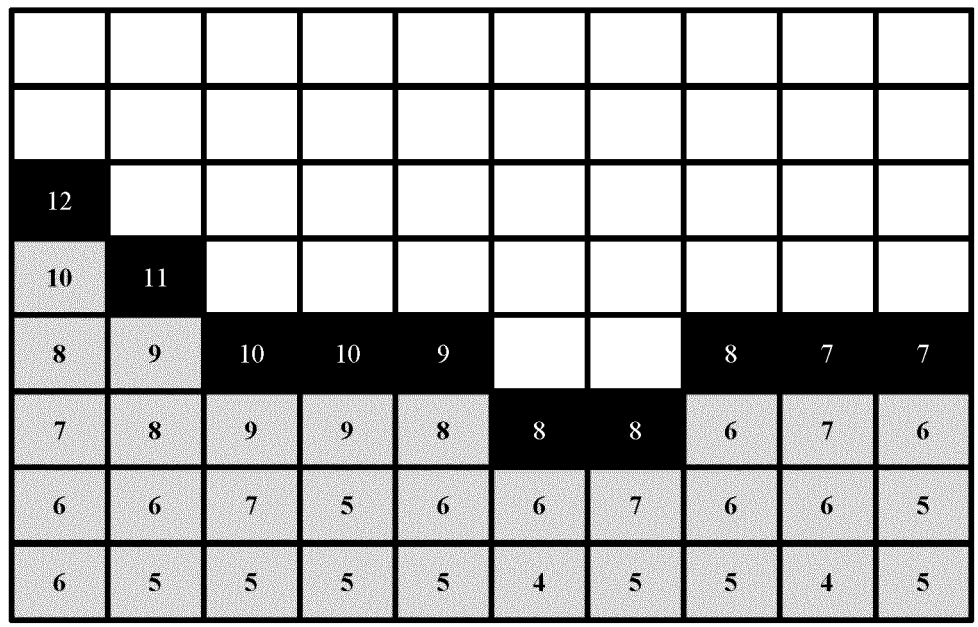

FIG. 11 illustrates an example of the embodiment of sub-step 7032.

Figure 12:
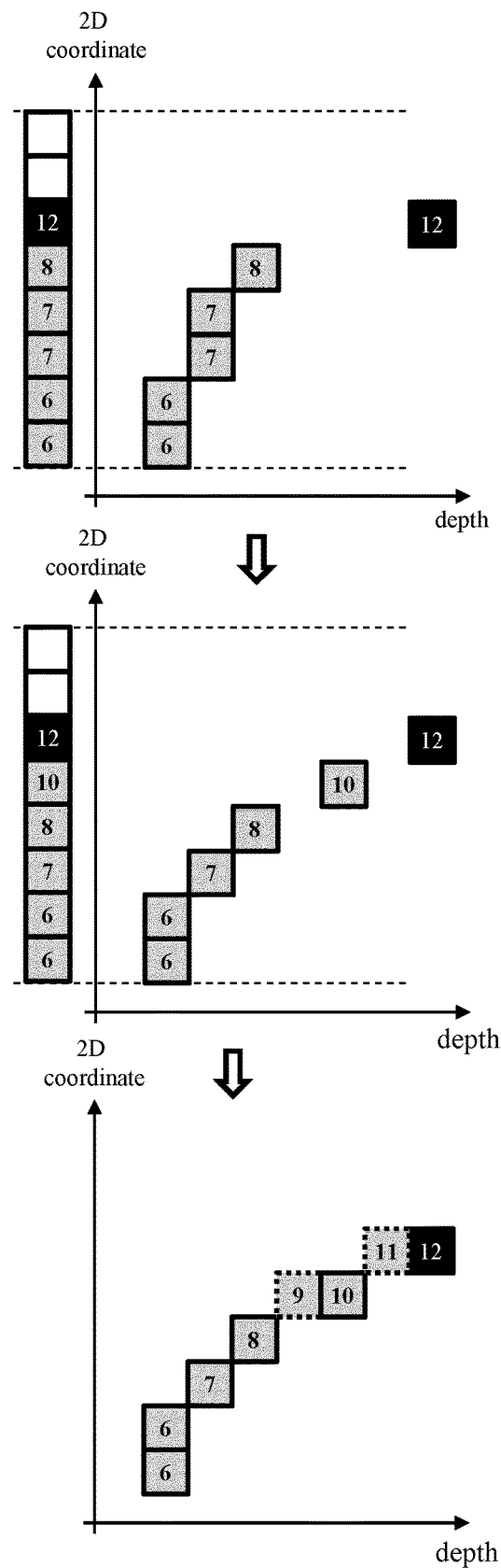

FIG. 12 illustrates an example of the embodiment of sub-step 7033.

Figure 13:
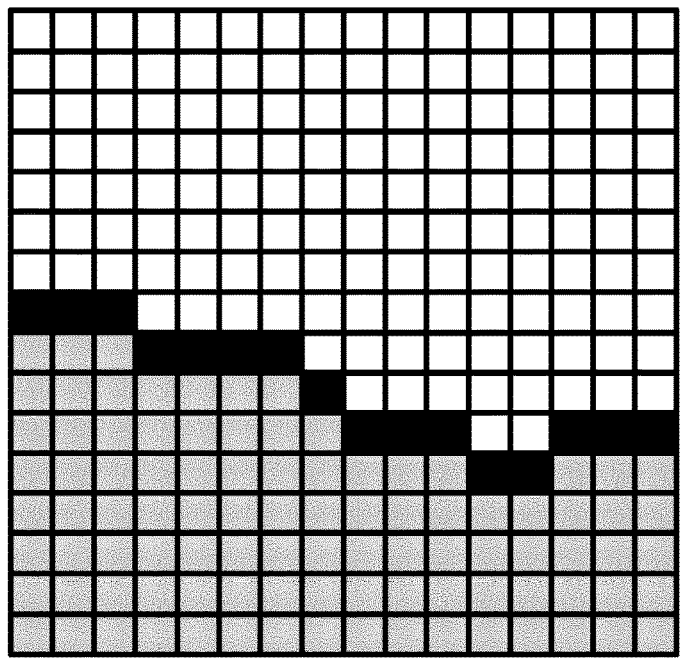
Figure 13:
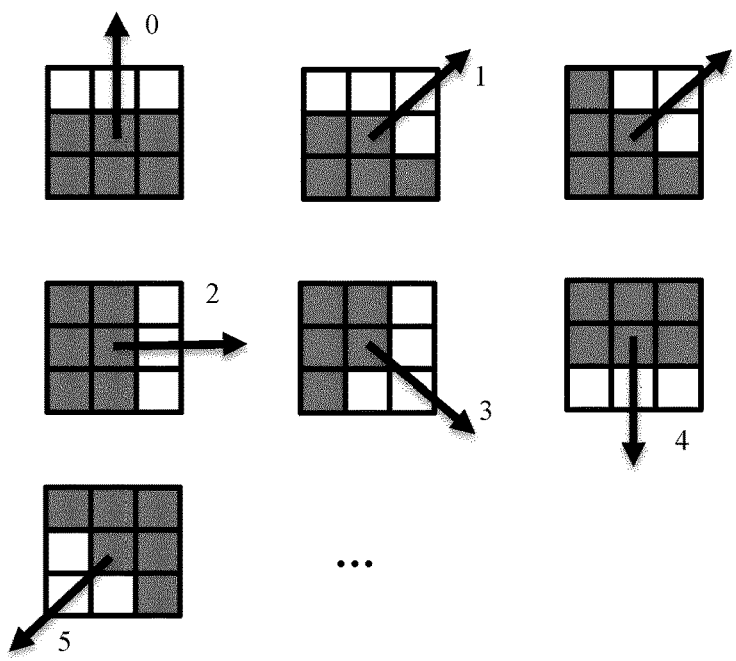

FIG. 13 illustrates examples of occupancy map contour and 2D pattern used to extract the orientations and the corresponding normals.

Figure 14:
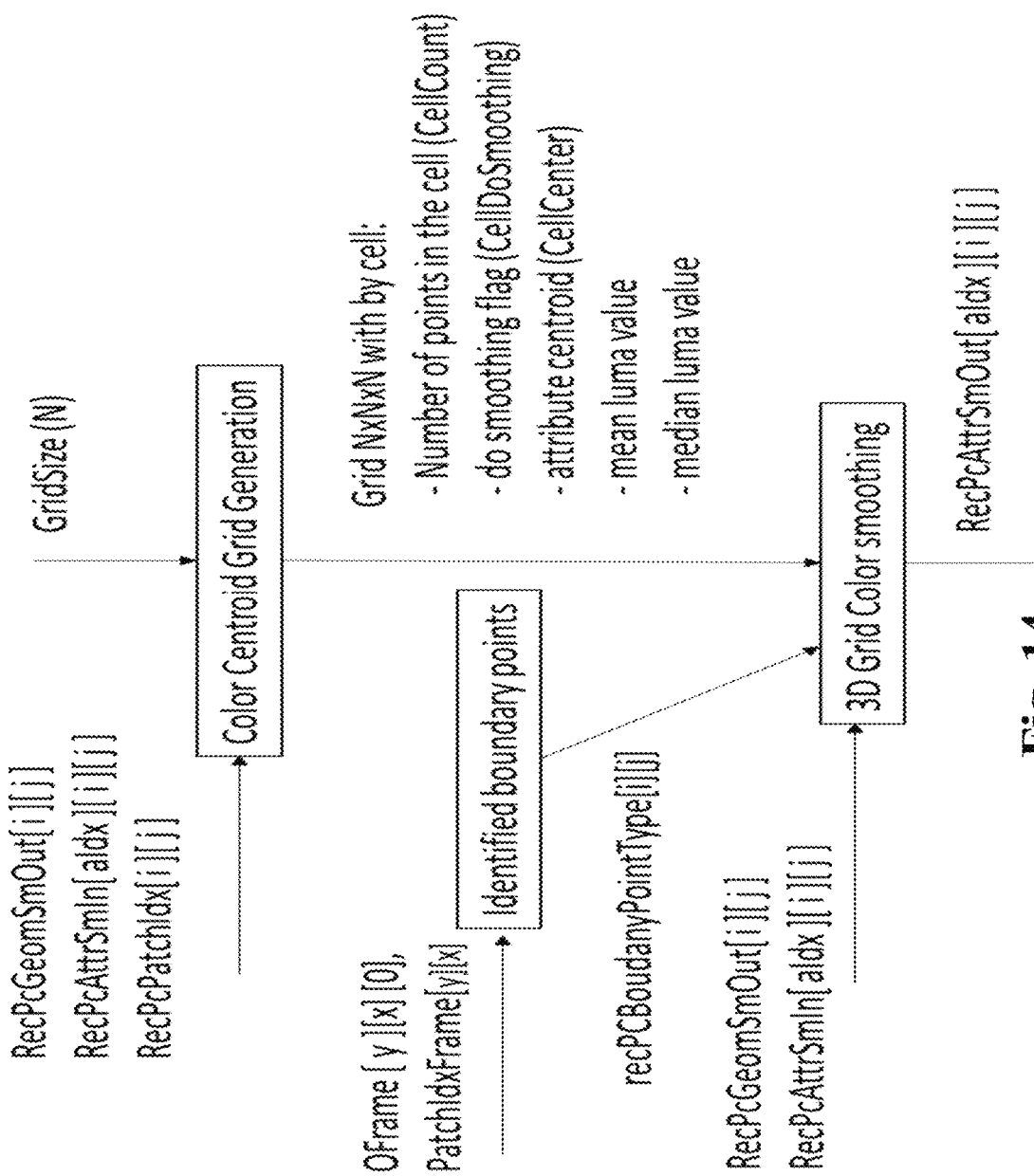

FIG. 14 shows an example of a 3D color grid geometry smoothing.

Figure 15:
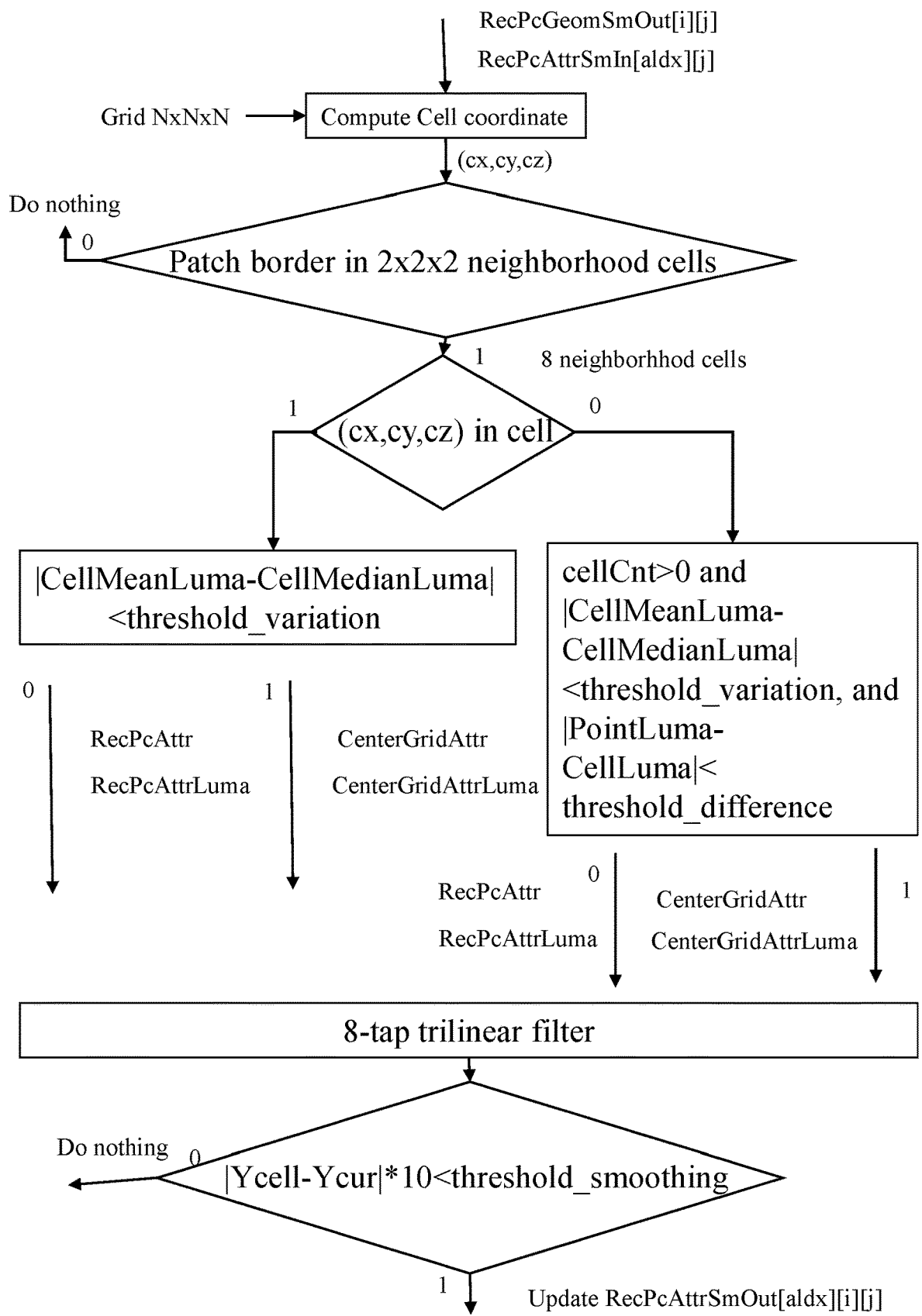

FIG. 15 provides an illustration of 3D color grid attribute smoothing.

Figure 16:
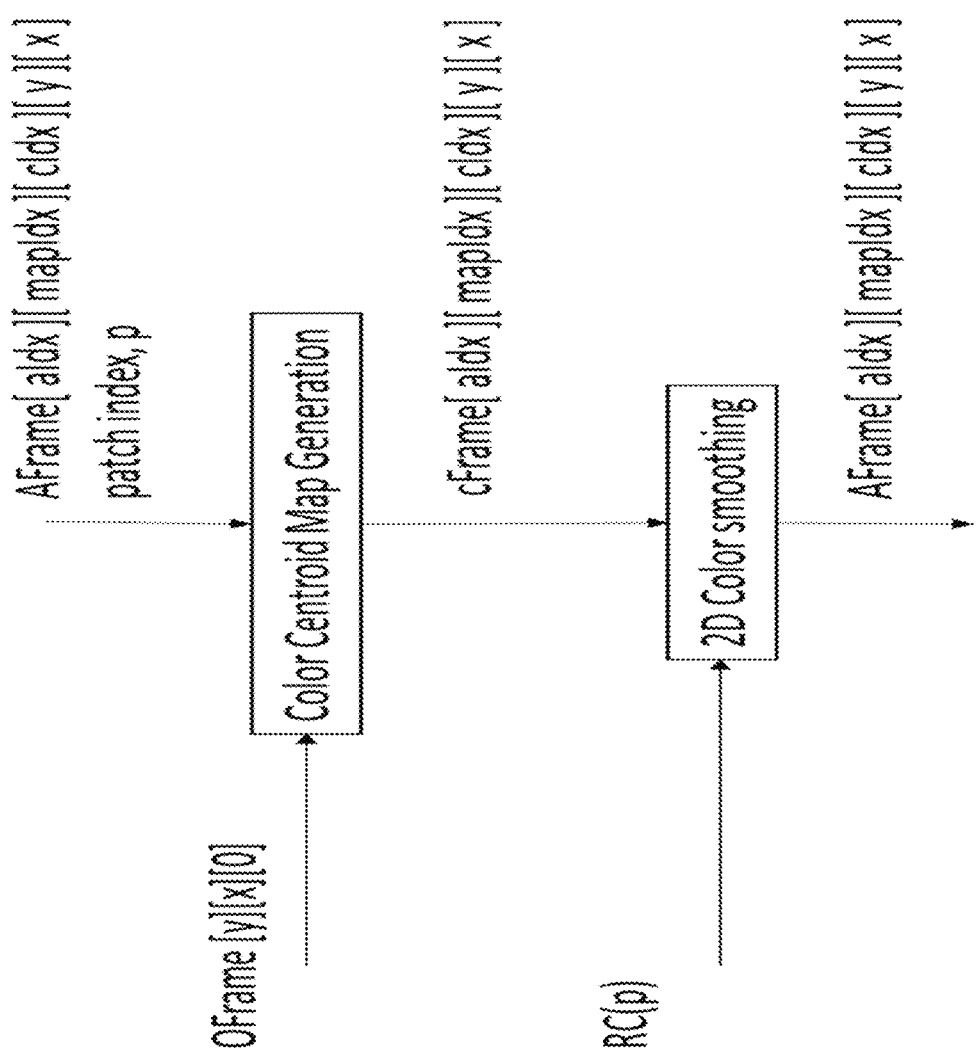

FIG. 16 illustrates one or more aspects of the present color smoothing embodiments which solve some color problems on patch border.

Figure 17A:
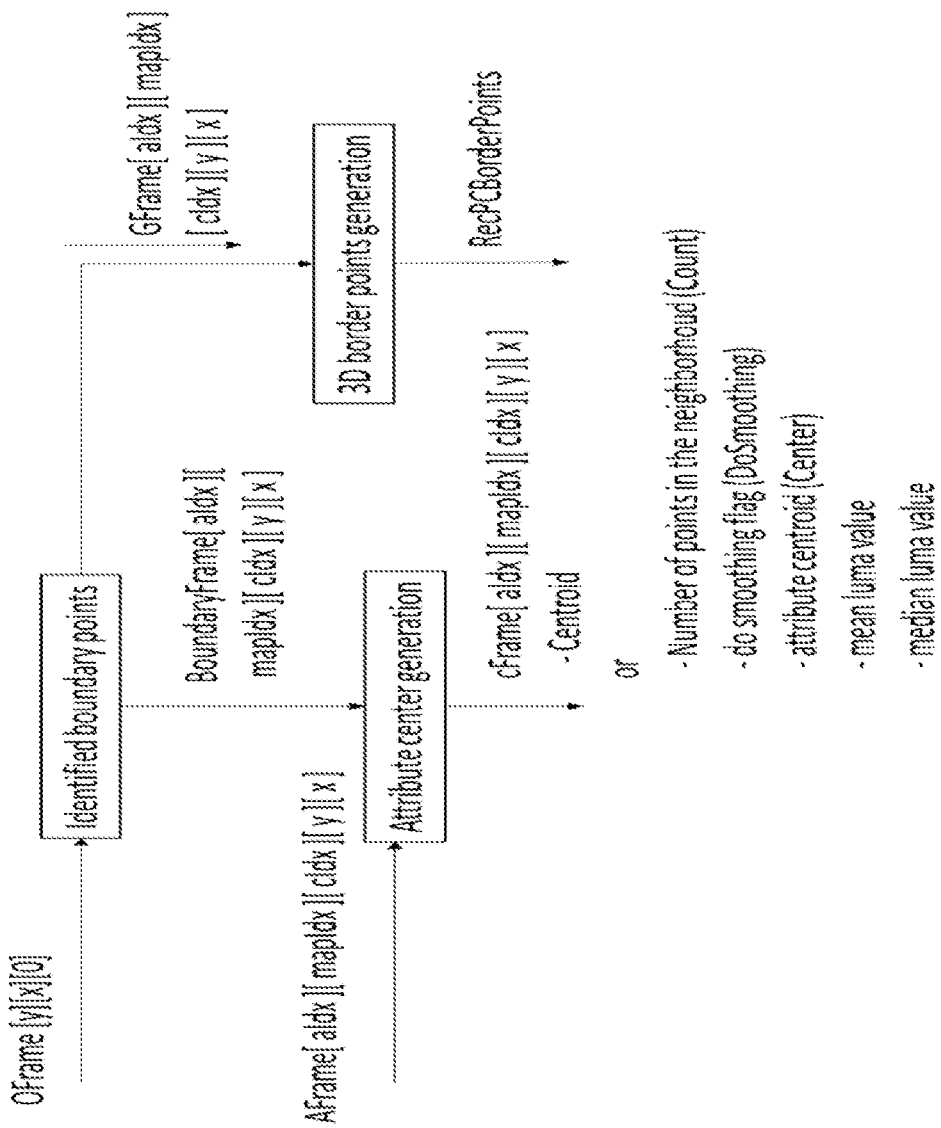
Figure 17B:
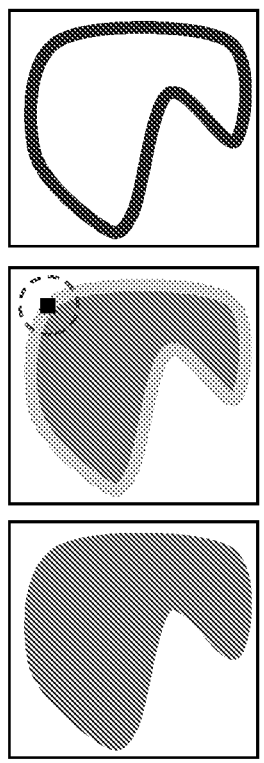

FIG. 17A and FIG. 17B illustrate an example for computing a frame of color centroids.

Figure 18A:
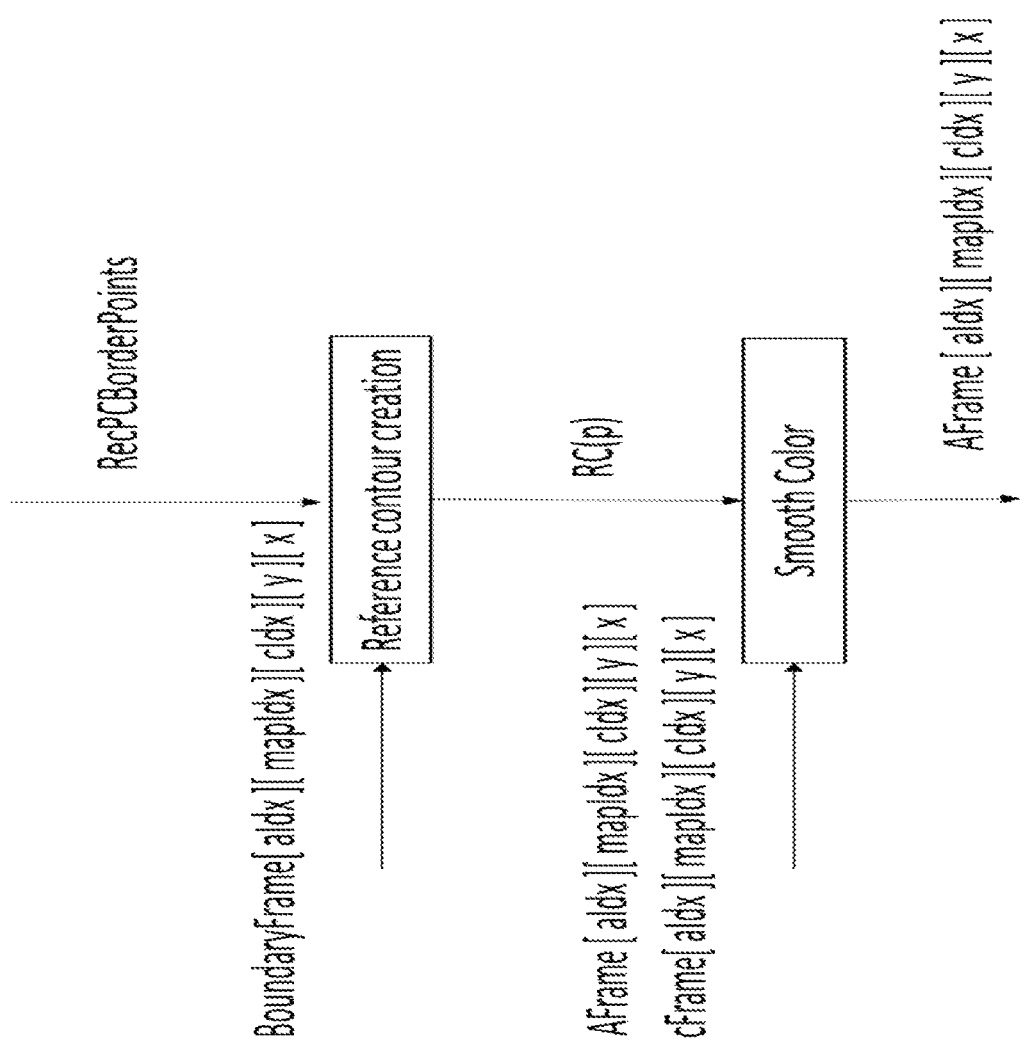
Figure 18B:
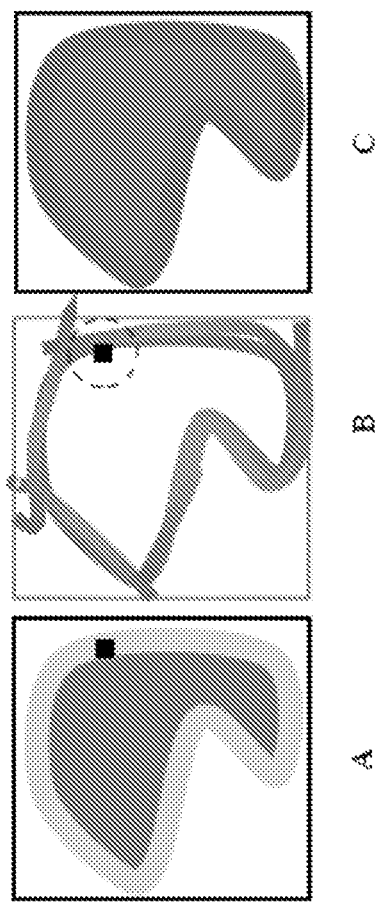

FIG. 18A and FIG. 18B, for all border points, one or more aspects of a 2D Color smoothing embodiments that compute a smoothed color centroid with all border points (with the affected centroid computed in FIGS. 17A and 17B), and update the attribute value with the smoothed color centroid.

Figure 19:
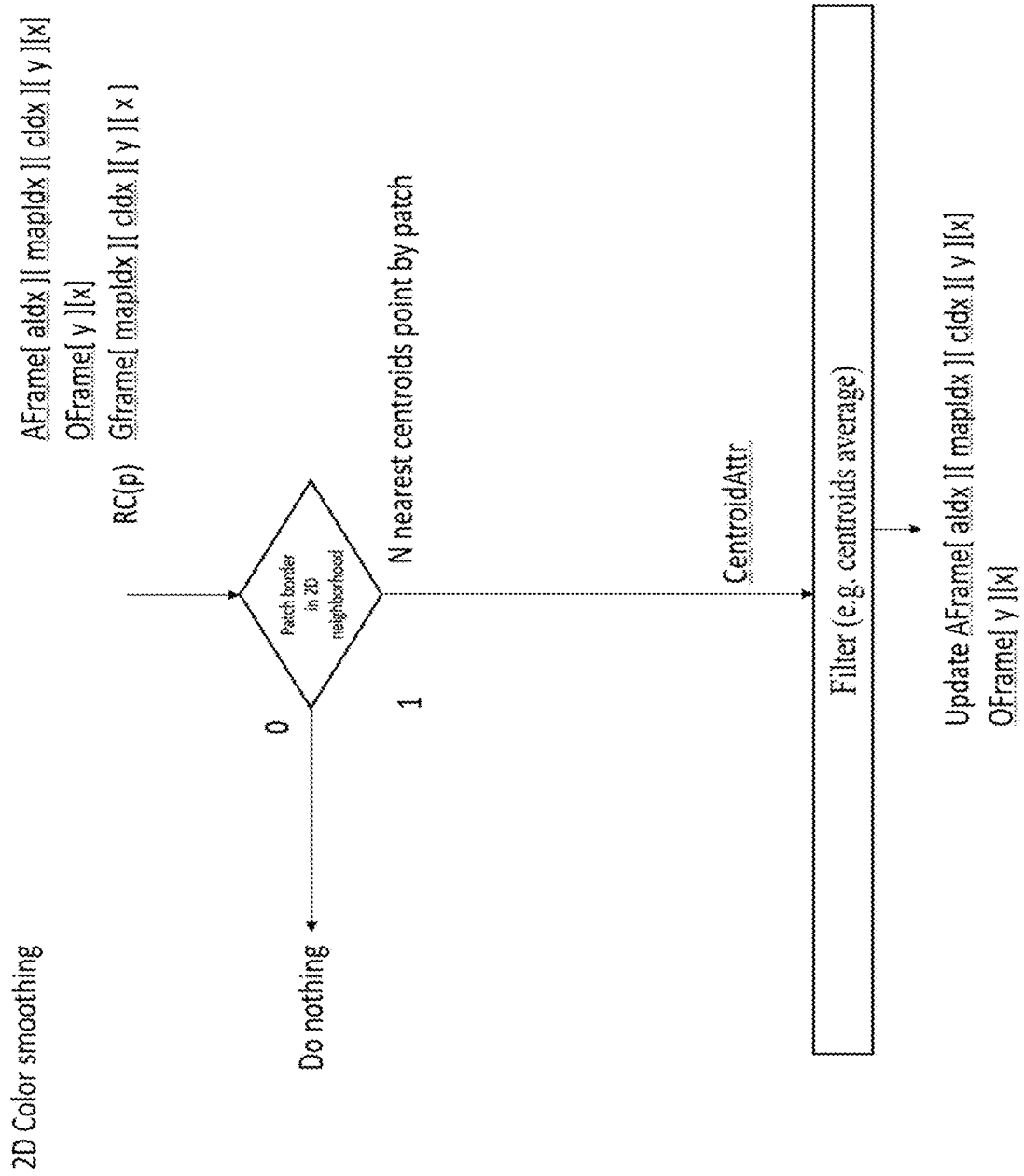

FIG. 19 illustrates a first variation of the smooth color module or process shown in FIG. 18A.

Figure 20:
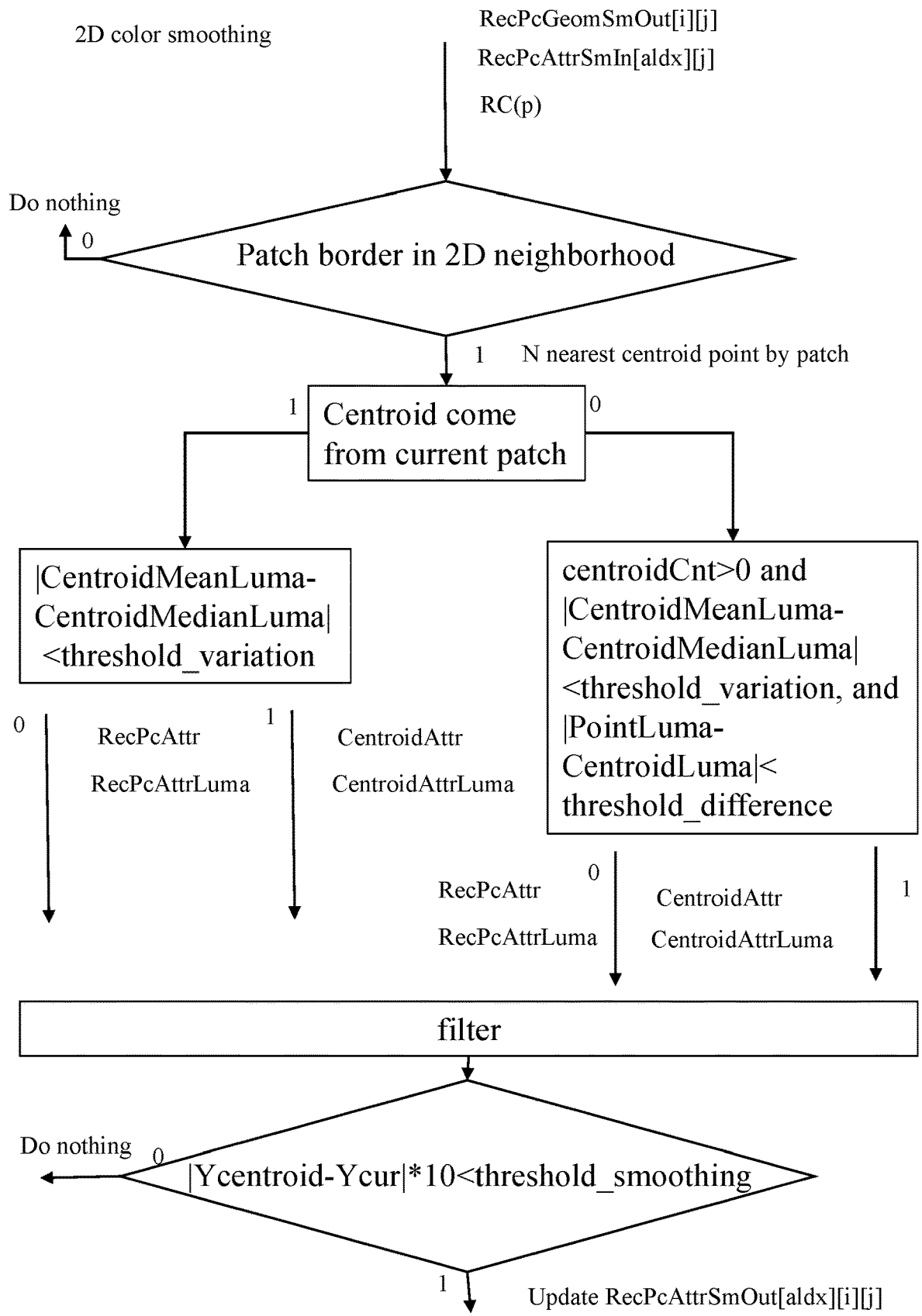

FIG. 20 illustrates another variation of the smooth color module or process shown in FIG. 18A.

FIG. 21 illustrates an example of a process 2100 according to one or more aspects of the present embodiments.

DETAILED DESCRIPTION

At least one of the present embodiments is described more fully hereinafter with reference to the accompanying figures, in which examples of at least one of the present embodiments are shown. An embodiment may, however, be embodied in many alternate forms and should not be construed as limited to the examples set forth herein. Accordingly, it should be understood that there is no intent to limit embodiments to the particular forms disclosed. On the contrary, the disclosure is intended to cover all modifications, equivalents, and alternatives falling within the spirit and scope of this application.

When a figure is presented as a flow diagram, it should be understood that it also provides a block diagram of a corresponding apparatus. Similarly, when a figure is presented as a block diagram, it should be understood that it also provides a flow diagram of a corresponding method/process.

Similar or same elements of figures are referenced with the same reference numbers.

Some figures represent syntax tables widely used in Video-based Point Cloud Compression (abbreviated as V-PCC) for defining the structure of a bitstream for V-PCC. An example of V-PCC is Test model Category 2 (TMC2) algorithm that implements the MPEG draft standard as defined in ISO/IEC JTC1/SC29/WG11 MPEG2019/w18180 (January 2019, Marrakesh).

In those syntax tables, the term ' . . . ' denotes unchanged portions of the syntax with respect to the original definition given in V-PCC and removed in the figures to facilitate reading. Bold terms in figures indicate that a value for this term is obtained by parsing a bitstream. The right column of the syntax tables indicates the number of bits for encoding a data of a syntax element. For example, u(4) indicates that 4 bits are used for encoding a data, u(8) indicates 8 bits, ae(v) indicates a context adaptive arithmetic entropy coded syntax element.

The aspects described and contemplated below may be implemented in many different forms. FIGS. 1-21 below provide some embodiments, but other embodiments are contemplated, and the discussion of FIGS. 1-21 does not limit the breadth of the implementations.

At least one of the aspects generally relates to point cloud encoding and decoding, and at least one other aspect generally relates to transmitting a bitstream generated or encoded.

Figure 3:
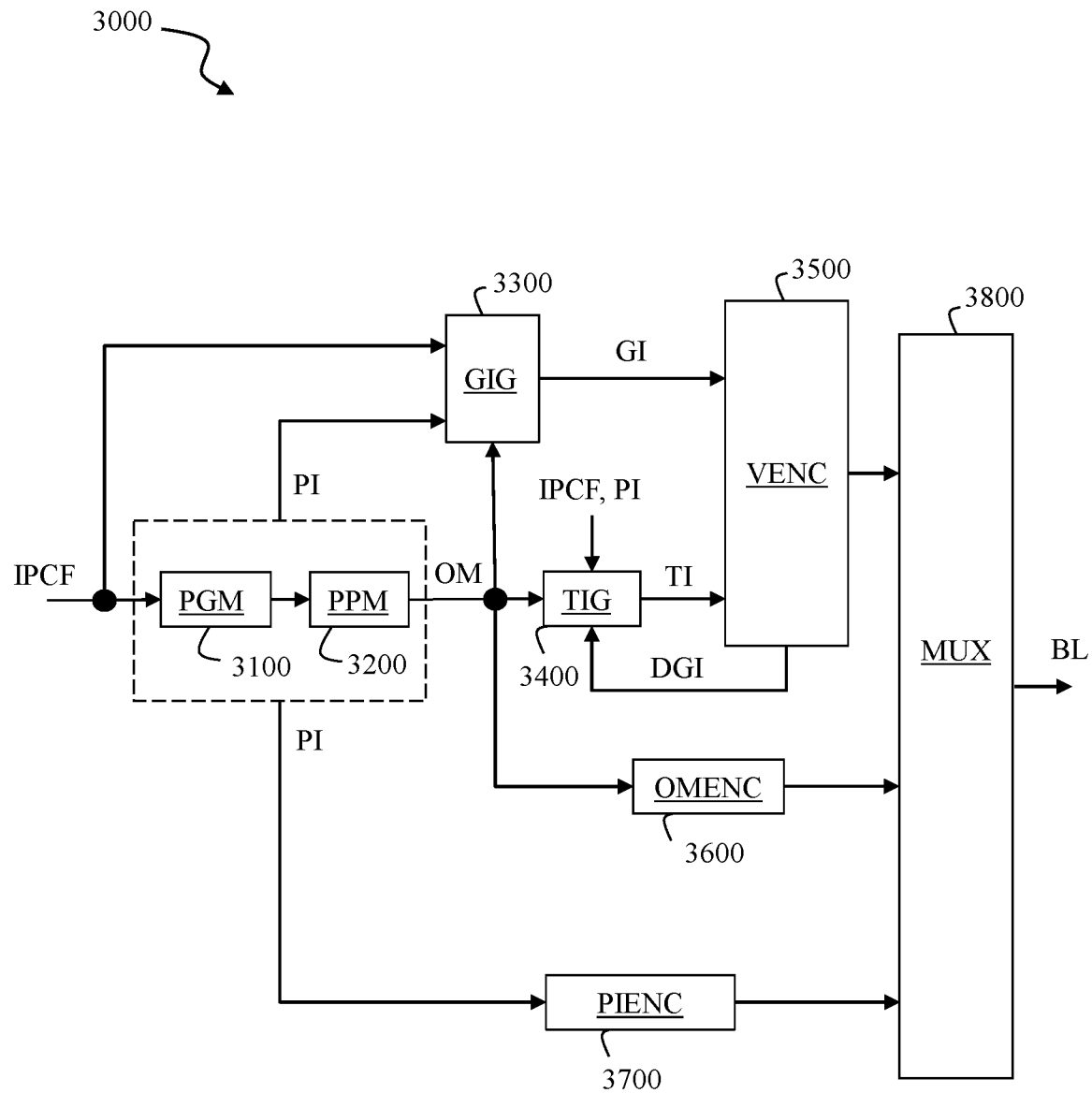
FIG. 3 illustrates a schematic block diagram of an example of an image-based point cloud encoder 3000 in accordance with at least one of the present embodiments.
Figure 4:
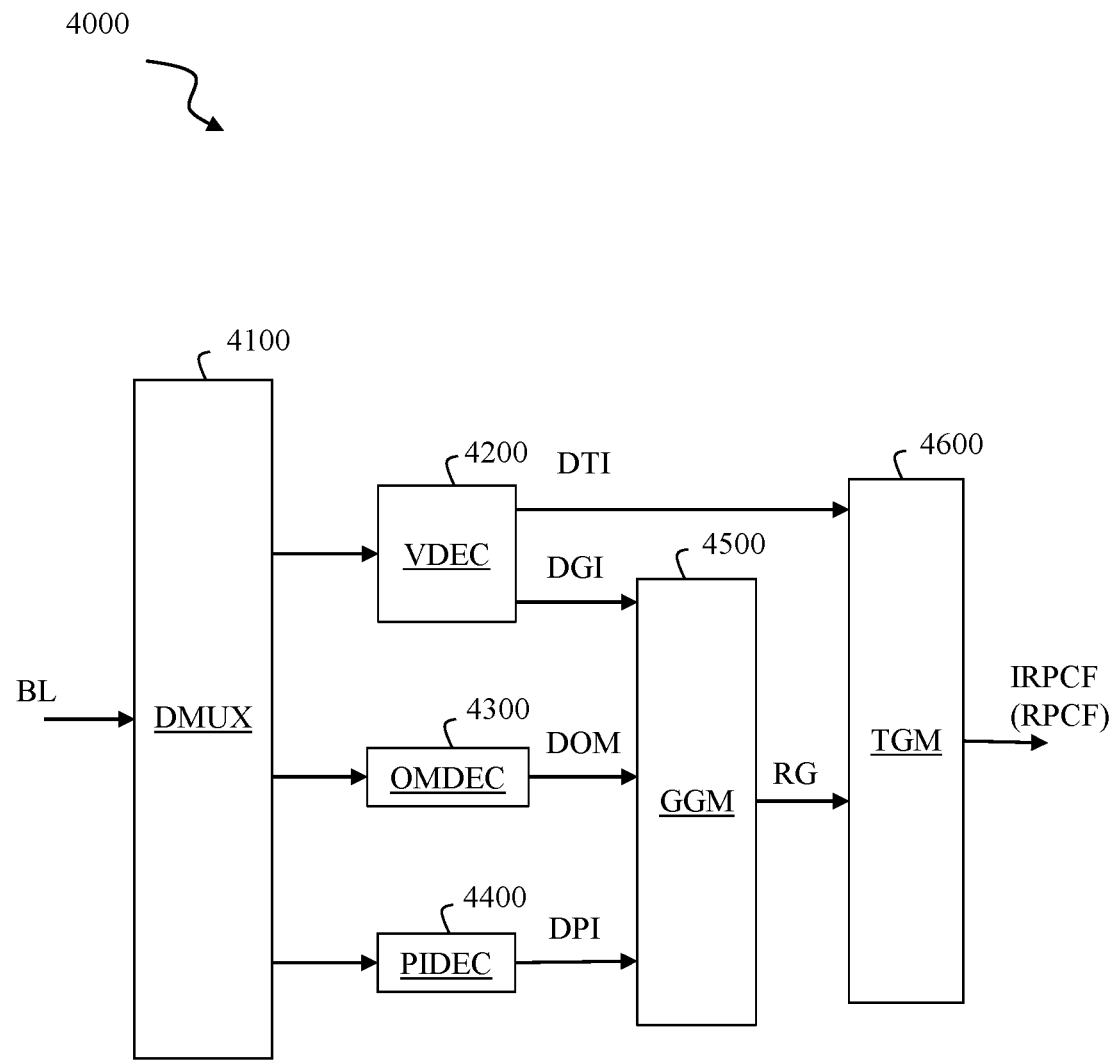
FIG. 4 illustrates a schematic block diagram of an example of an image-based point cloud decoder 4000 in accordance with at least one of the present embodiments.

More precisely, various methods and other aspects described herein may be used to modify modules such as, for example, a texture image generator TIG (3400) of the encoder 3000 of FIG. 3, a geometry generating module GGM (4500), and/or a texture generating module (4600) of the decoder 4000 as shown in FIG. 4.

Moreover, the present aspects are not limited to MPEG standards such as MPEG-I part 5 that relates to the Point Cloud Compression, and may be applied, for example, to other standards and recommendations, whether pre-existing or future-developed, and extensions of any such standards and recommendations (including MPEG-I part 5). Unless indicated otherwise, or technically precluded, the aspects described in this application may be used individually or in combination.

In the following, image data may refer to data representing, for example, one or several arrays of 2D samples in a specific image/video format. A specific image/video format may specify information pertaining to pixel values of an image (or a video). A specific image/video format may also specify information which may be used by a display and/or any other apparatus to visualize and/or decode an image (or video) for example. An image typically includes a first component, in the shape of a first 2D array of samples, usually representative of luminance (or luma) of the image. An image may also include a second component and a third component, in the shape of other 2D arrays of samples, usually representative of the chrominance (or chroma) of the image. Some embodiments represent the same information using a set of 2D arrays of color samples, such as the traditional tri-chromatic RGB representation.

A pixel value is represented in one or more embodiments by a vector of C values, where C is the number of components. Each value of a vector is typically represented with a number of bits which may define a dynamic range of the pixel values.

An image block means a set of pixels which belong to an image. The pixel values of an image block (or image block data) refer to the values of the pixels which belong to this image block. An image block may have an arbitrary shape, although rectangles are common.

A point cloud may be represented by a dataset of 3D samples within a 3D volumetric space that have unique coordinates and that may also have one or more attributes.

A 3D sample of this data set may be defined by its spatial location (X, Y, and Z coordinates in a 3D space) and possibly by one or more associated attributes such as a color, represented in the RGB or YUV color space for example, a transparency, a reflectance, a two-component normal vector or any feature representing a feature of this sample. For example, a 3D sample may be defined by 6 components (X, Y, Z, R, G, B) or equivalently (X, Y, Z, y, U, V) where (X,Y,Z) defines the coordinates of a point in a 3D space and (R,G,B) or (y,U,V) defines a color of this 3D sample. The same type of attribute may be present multiple times. For example, multiple color attributes may provide color information from different points of view.

A point cloud may be static or dynamic depending on whether or not the cloud changes with respect to time. A static point cloud or an instance of a dynamic point cloud is usually denoted as a point cloud frame. It should be noticed that in the case of a dynamic point cloud, the number of points is generally not constant but, on the contrary, generally changes with time. More generally, a point cloud may be considered as dynamic if anything changes with time, such as, for example, the number of points, the position of one or more points, or any attribute of any point.

As an example, a 2D sample may be defined by 6 components (u, v, Z, R, G, B) or equivalently (u, v, Z, y, U, V). (u,v) defines the coordinates of a 2D sample in a 2D space of the projection plane. Z is the depth value of a projected 3D sample onto this projection plane. (R,G,B) or (y,U,V) defines a color of this 3D sample.

Figure 1:
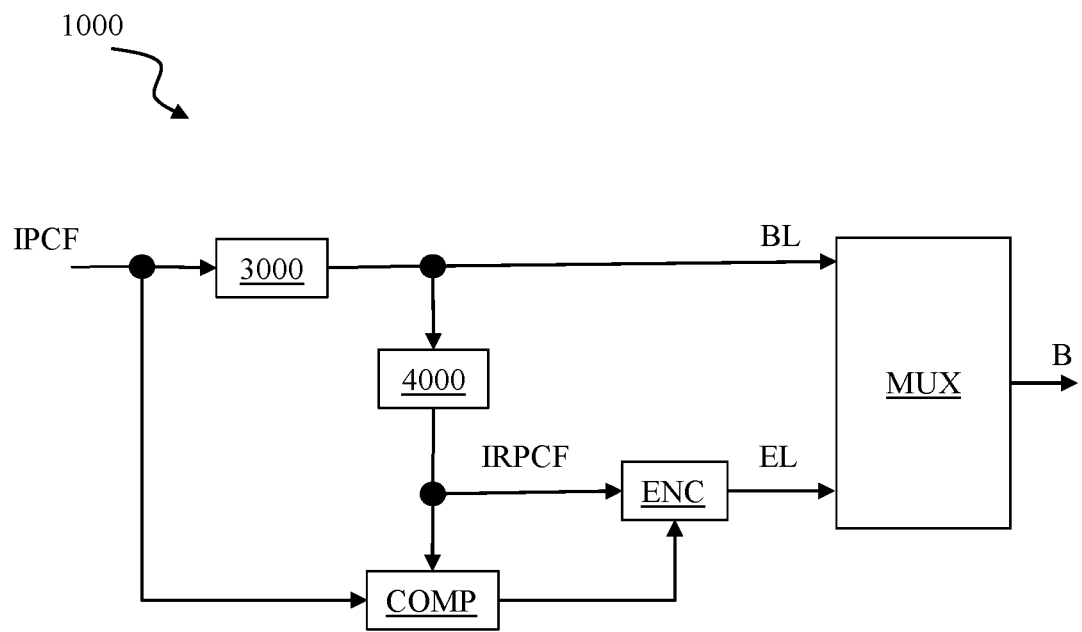
FIG. 1 illustrates a schematic block diagram of an example of a two-layer-based point cloud encoding structure 1000 in accordance with at least one of the present embodiments.

FIG. 1 illustrates a schematic block diagram of an example of a two-layer-based point cloud encoding structure 1000 in accordance with at least one of the present embodiments.

The two-layer-based point cloud encoding structure 1000 may provide a bitstream B representative of an input point cloud frame IPCF. Possibly, the input point cloud frame IPCF represents a frame of a dynamic point cloud. Then, a frame of the dynamic point cloud may be encoded by the two-layer-based point cloud encoding structure 1000 independently from another frame.

Basically, the two-layer-based point cloud encoding structure 1000 may provide ability to structure the bitstream B as a Base Layer BL and an Enhancement Layer EL. The base layer BL may provide a lossy representation of an input point cloud frame IPCF and the enhancement layer EL may provide a higher quality (possibly lossless) representation by encoding isolated points not represented by the base layer BL.

The base layer BL may be provided by an image-based encoder 3000 as illustrated in FIG. 3. The image-based encoder 3000 may provide geometry/texture images representing the geometry/attributes of 3D samples of the input point cloud frame IPCF. It may allow isolated 3D samples to be discarded. The base layer BL may be decoded by an image-based decoder 4000 as illustrated in FIG. 4 that may provide an intermediate reconstructed point cloud frame IRPCF.

Then, back to the two-layer-based point cloud encoding 1000 in FIG. 1, a comparator COMP may compare the 3D samples of the input point cloud frame IPCF to the 3D samples of the intermediate reconstructed point cloud frame IRPCF in order to detect/locate missed/isolated 3D samples. Next, an encoder ENC may encode the missed 3D samples and may provide the enhancement layer EL. Finally, the base layer BL and the enhancement layer EL may be multiplexed together by a multiplexer MUX so as to generate the bitstream B.

According to an embodiment, the encoder ENC may comprise a detector that may detect and associate a 3D reference sample R of the intermediate reconstructed point cloud frame IRPCF to a missed 3D samples M.

For example, a 3D reference sample R associated with a missed 3D sample M may be its nearest neighbor of M according to a given metric.

According to an embodiment, the encoder ENC may then encode the spatial locations of the missed 3D samples M and their attributes as differences determined according to spatial locations and attributes of the 3D reference samples R.

In a variant, those differences may be encoded separately.

For example, fora missed 3D sample M, with spatial coordinates x(M), y(M) and z(M), a x-coordinate position difference Dx(M), a y-coordinate position difference Dy(M), a z-coordinate position difference Dz(M), a R-attribute component difference Dr(M), a G-attribute component difference Dg(M) and the B-attribute component difference Db(M) may be calculated as follows:

$$Dx(M)=x(M)-x(R),$$

where x(M) is the x-coordinate of the 3D sample M, respectively R in a geometry image provided by FIG. 3, $$Dy(M)=y(M)-y(R)$$

where y(M) is the y-coordinate of the 3D sample M, respectively R in a geometry image provided by FIG. 3, $$Dz(M)=z(M)-z(R)$$

where z(M) is the z-coordinate of the 3D sample M, respectively R in a geometry image provided by FIG. 3, $$Dr(M)=R(M)-R(R).$$

where R(M), respectively R(R) is the r-color component of a color attribute of the 3D sample M, respectively R, $$Dg(M)=G(M)-G(R).$$

where G(M), respectively G(R) is the g-color component of a color attribute of the 3D sample M, respectively R, $$Db(M)=B(M)-B(R).$$

where B(M), respectively B(R) is the b-color component of a color attribute of the 3D sample M, respectively R.

Figure 2:
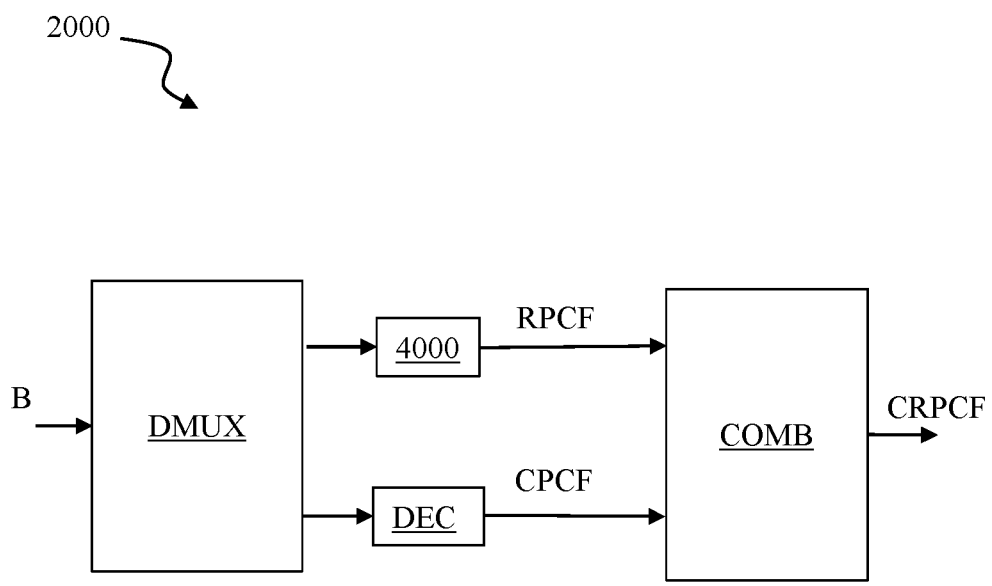
FIG. 2 illustrates a schematic block diagram of an example of a two-layer-based point cloud decoding structure 2000 in accordance with at least one of the present embodiments.

FIG. 2 illustrates a schematic block diagram of an example of a two-layer-based point cloud decoding structure 2000 in accordance with at least one of the present embodiments.

The behavior of the two-layer-based point cloud decoding structure 2000 depends on its capabilities.

A two-layer-based point cloud decoding structure 2000 with limited capabilities may access only the base layer BL from the bitstream B by using a de-multiplexer DMUX, and then may provide a faithful (but lossy) version IRPCF of the input point cloud frame IPCF by decoding the base layer BL by a point cloud decoder 4000 as illustrated in FIG. 4.

A two-layer-based point cloud decoding structure 2000 with full capabilities may access both the base layer BL and the enhancement layer EL from the bitstream B by using the de-multiplexer DMUX. The point cloud decoder 4000, as illustrated in FIG. 4, may determine the intermediate reconstructed point cloud frame IRPCF from the base layer BL. The decoder DEC may determine a complementary point cloud frame CPCF from the enhancement layer EL. A combiner COM then may combine together the intermediate reconstructed point cloud frame IRPCF and the complementary point cloud frame CPCF to therefore provide a higher quality (possibly lossless) representation (reconstruction) CRPCF of the input point cloud frame IPCF.

FIG. 3 illustrates a schematic block diagram of an example of an image-based point cloud encoder 3000 in accordance with at least one of the present embodiments.

The image-based point cloud encoder 3000 leverages existing video codecs to compress the geometry and texture (attribute) information of a dynamic point cloud. This is accomplished by essentially converting the point cloud data into a set of different video sequences.

In particular embodiments, two videos, one for capturing the geometry information of the point cloud data and another for capturing the texture (e.g., color/attribute) information, may be generated and compressed using existing video codecs. An example of an existing video codec is the HEVC Main profile encoder/decoder (ITU-T H.265 Telecommunication standardization sector of ITU (February 2018), series H: audiovisual and multimedia systems, infrastructure of audiovisual services-coding of moving video, High efficiency video coding, Recommendation ITU-T H.265).

Additional metadata that are used to interpret the two videos are typically also generated and compressed separately. Such additional metadata includes, for example, an occupancy map OM and/or auxiliary patch information PI.

The generated video bitstreams and the metadata may be then multiplexed together so as to generate a combined bitstream.

It should be noted that the metadata typically represent a small amount of the overall information. The bulk of the information is in the video bitstreams.

In step 3100, a patch generation module PGM may generate at least one patch by decomposing 3D samples of a data set representative of the input point cloud frame IPCF to 2D samples on a projection plane using a strategy that provides best compression.

A patch may be defined as a set of 2D samples.

For example, in V-PCC, a normal at every 3D sample is first estimated as described, for example, in Hoppe et al. (Hugues Hoppe, Tony DeRose, Tom Duchamp, John McDonald, Werner Stuetzle. Surface reconstruction from unorganized points. *ACM SIGGRAPH* 1992 *Proceedings*, 71-78). Next, an initial clustering of the input point cloud frame IPCF is obtained by associating each 3D sample with one of the six oriented planes of a 3D bounding box encompassing the 3D samples of the input point cloud frame IPCF. More precisely, each 3D sample is clustered and associated with an oriented plane that has the closest normal (that is maximizes the dot product of the point normal and the plane normal). Then the 3D samples are projected to their associated planes. A set of 3D samples that forms a connected area in their plane is referred as a connected component. A connected component is a set of at least one 3D sample having similar normal and a same associated oriented plane. The initial clustering is then refined by iteratively updating the cluster associated with each 3D sample based on its normal and the clusters of its nearest neighboring samples. The final step consists of generating one patch from each connected component, that is done by projecting the 3D samples of each connected component onto the oriented plane associated with the connected component. A patch is associated with auxiliary patch information PI that represents auxiliary patch information defined for each patch to interpret the projected 2D samples that correspond to the geometry and/or attribute information.

In V-PCC, for example, the auxiliary patch information PI includes 1) information indicating one of the six oriented planes of a 3D bounding box encompassing the 3D samples of a connected component; 2) information relative to the plane normal; 3) information determining the 3D location of a connected component relative to a patch represented in terms of depth, tangential shift and bi-tangential shift; and 4) information such as coordinates (u0, v0, u1, v1) in a projection plane defining a 2D bounding box encompassing a patch.

In step 3200, a patch packing module PPM may map (place) at least one generated patch onto a 2D grid (also called canvas) without any overlapping in a manner that typically minimizes the unused space, and may guarantee that every T×T (for example, 16×16) block of the 2D grid is associated with a unique patch. A given minimum block size T×T of the 2D grid may specify the minimum distance between distinct patches as placed on this 2D grid. The 2D grid resolution may depend on the input point cloud size and its width W and height H and the block size T may be transmitted as metadata to the decoder.

The auxiliary patch information PI may further include information relative to an association between a block of the 2D grid and a patch.

In V-PCC, the auxiliary information PI may include a block to patch index information (BlockToPatch) that determines an association between a block of the 2D grid and a patch index.

Figure 3A:
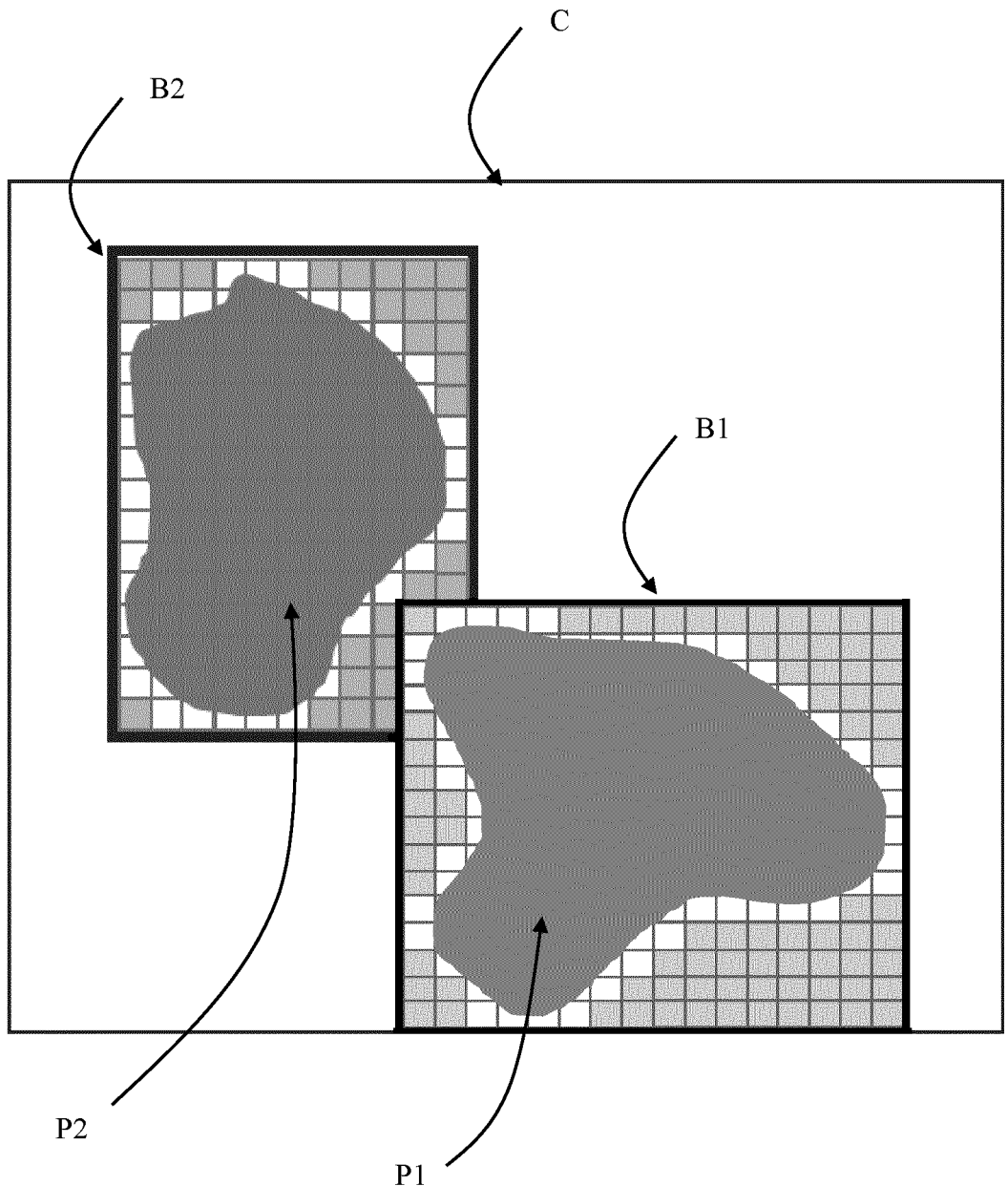
FIG. 3a illustrates an example of a canvas C comprising 2 patches P1 and P2 and their associated 2D bounding boxes B1 and B2.

FIG. 3a illustrates an example of a canvas C comprising 2 patches P1 and P2 and their associated 2D bounding boxes B1 and B2. Note that two bounding boxes may overlap in the canvas C as illustrated on FIG. 3a. The 2D grid (the splitting of the canvas) is only represented inside the bounding box but the splitting of the canvas also occurs outside those bounding boxes. A bounding box associated with a patch can be split into T×T blocks, typically T=16.

T×T blocks containing 2D samples belonging to a patch may be considered as occupied blocks. Each occupied block of the canvas is represented by a particular pixel value (for example 1) in the occupancy map OM and each unoccupied block of the canvas is represented by another particular value, for example 0. Then, a pixel value of the occupancy map OM may indicate whether a T×T block of the canvas is occupied, that is contains 2D samples that belong to a patch.

In FIG. 3a, an occupied block is represented by a white block and light grey blocks represent unoccupied blocks. The image generation processes (steps 3300 and 3400) exploit the mapping of the at least one generated patch onto the 2D grid computed during step 3200, to store the geometry and texture of the input point cloud frame IPCF as images.

In step 3300, a geometry image generator GIG may generate at least one geometry image GI from the input point cloud frame IPCF, the occupancy map OM and the auxiliary patch information PI. The geometry image generator GIG may exploit the occupancy map information in order to detect (locate) the occupied blocks and thus the non-empty pixels in the geometry image GI.

A geometry image GI may represent the geometry of the input point cloud frame IPCF and may be a monochromatic image of W×H pixels represented, for example, in YUV420-8 bit format.

In order to better handle the case of multiple 3D samples being projected (mapped) to a same 2D sample of the projection plane (along a same projection direction (line)), multiple images, referred to as layers, may be generated. Thus, different depth values D1, . . . , Dn may be associated with a 2D sample of a patch and multiple geometry images may then be generated.

In V-PCC, 2D samples of a patch are projected onto two layers. A first layer, also called the near layer, may store, for example, the depth values D0 associated with the 2D samples with smaller depths. A second layer, referred to as the far layer, may store, for example, the depth values D1 associated with the 2D samples with larger depths. Alternatively, the second layer may store difference values between depth values D1 and D0. For example, the information stored by the second depth image may be within an interval [0, Δ] corresponding to depth values in the range [D0, D0+Δ], where Δ is a user-defined parameter that describes the surface thickness.

By this way, the second layer may contain significant contour-like high frequency features. Thus, it clearly appears that the second depth image may be difficult to code by using a legacy video coder and, therefore, the depth values may be poorly reconstructed from the decoded second depth image, which results on a poor quality of the geometry of the reconstructed point cloud frame.

According to an embodiment, the geometry image generating module GIG may code (derive) depth values associated with 2D samples of the first and second layers by using the auxiliary patch information PI.

In V-PCC, the location of a 3D sample in a patch with a corresponding connected component may be expressed in terms of depth δ(u, v), tangential shift s(u, v) and bi-tangential shift r(u, v) as follows:

$$\delta(u,v)=\delta 0+g(u,v)$$

$$s(u,v)=s0-u0+u$$

$$r(u,v)=r0-v0+v$$

where g(u, v) is the luma component of the geometry image, (u,v) is a pixel associated with the 3D sample on a projection plane, (δ0, s0, r0) is the 3D location of the corresponding patch of a connected component to which the 3D sample belongs and (u0, v0, u1, v1) are the coordinates in the projection plane defining a 2D bounding box encompassing the projection of the patch associated with the connected component.

Thus, a geometry image generating module GIG may code (derive) depth values associated with 2D samples of a layer (first or second or both) as a luma component $g(u,v)$ given by: $g(u,v)=\delta(u, v)-\delta 0$. It is noted that this relationship may be employed to reconstruct 3D sample locations (δ0, s0, r0) from a reconstructed geometry image g(u, v) with the accompanying auxiliary patch information PI.

According to an embodiment, a projection mode may be used to indicate if a first geometry image GI0 may store the depth values of the 2D samples of either the first or second layer and a second geometry image GI1 may store the depth values associated with the 2D samples of either the second or first layer.

For example, when a projection mode equals 0, then the first geometry image GI0 may store the depth values of 2D samples of the first layer and the second geometry image GI1 may store the depth values associated with 2D samples of the second layer. Reciprocally, when a projection mode equals 1, then the first geometry image GI0 may store the depth values of 2D samples of the second layer and the second geometry image GI1 may store the depth values associated with 2D samples of the first layer.

According to an embodiment, a frame projection mode may be used to indicate if a fixed projection mode is used for all the patches or if a variable projection mode is used in which each patch may use a different projection mode.

The projection mode and/or the frame projection mode may be transmitted as metadata.

A frame projection mode decision process may be provided, for example, in section 2.2.1.3.1 of V-PCC.

According to an embodiment, when the frame projection indicates that a variable projection mode may be used, a patch projection mode may be used to indicate the appropriate mode to use to (de-)project a patch.

A patch projection mode may be transmitted as metadata and may be, possibly, an information included in the auxiliary patch information PI.

A patch projection mode decision process is provided, for example in section 2.2.1.3.2 of V-PCC.

According to an embodiment of step 3300, the pixel value in a first geometry image, for example GI0, corresponding to a 2D sample (u,v) of a patch, may represent the depth value of least one in-between 3D sample defined along a projection line corresponding to the 2D sample (u,v). More precisely, the in-between 3D samples reside along a projection line and share the same coordinates of the 2D sample (u,v) whose depth value D1 is coded in a second geometry image, for example GI1. Further, the in-between 3D samples may have depth values between the depth value D0 and a depth value D1. A designated bit may be associated with each the in-between 3D samples which is set to 1 if the in-between 3D sample exists and 0 otherwise.

Figure 3B:
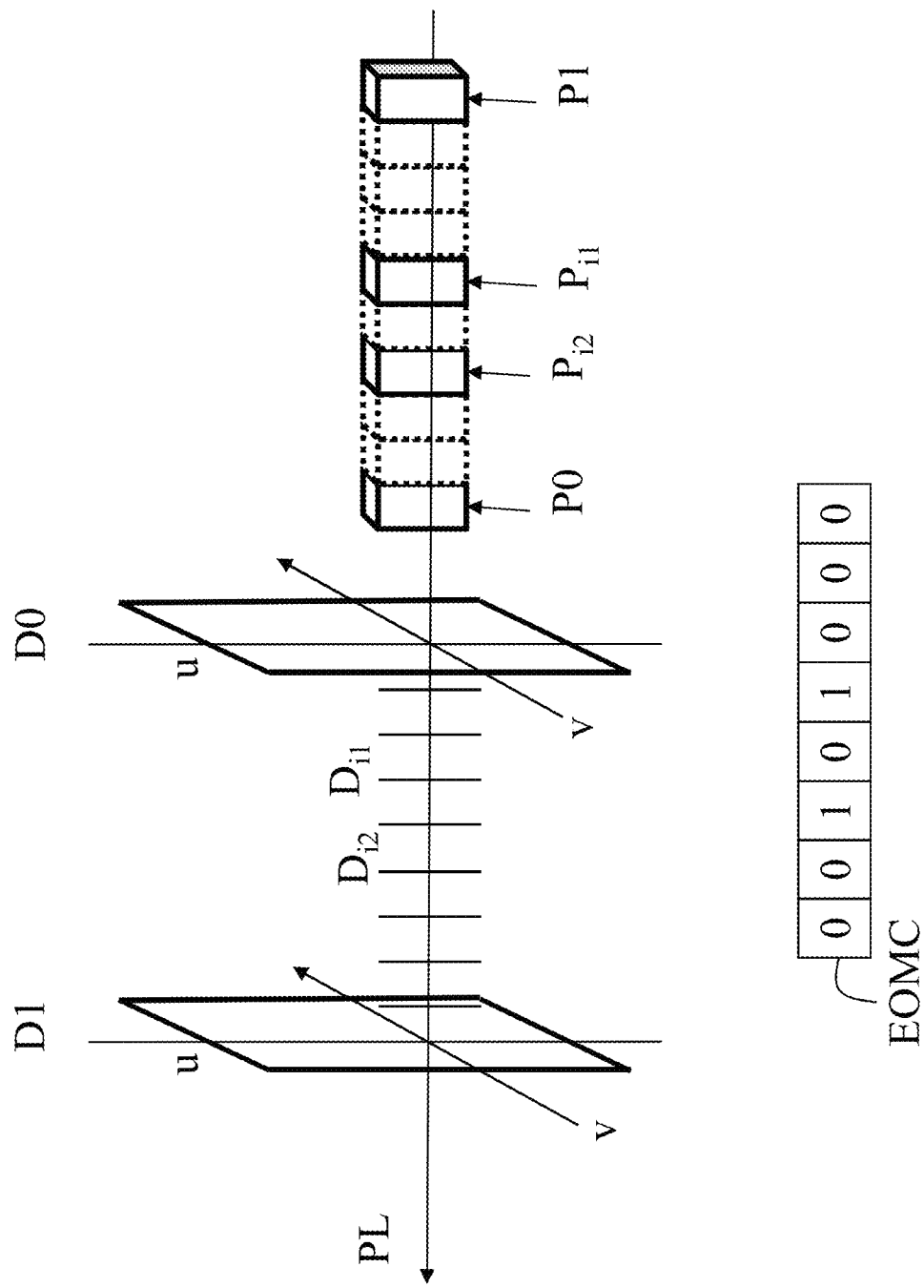
FIG. 3b illustrates an example of two in-between 3D samples Pi1 and Pi2 located between two 3D samples PO and P1 along a projection line PL.

FIG. 3b illustrates an example of two in-between 3D samples $P_{i1}$ and $P_{i2}$ located between two 3D samples P0 and P1 along a projection line PL. The 3D samples P0 and P1 have respectively depth values equal to D0 and D1. The depth values $D_{i1}$ and $D_{i2}$ of respectively the two in-between 3D samples $P_{i1}$ and $P_{i2}$ are greater than D0 and lower than D1.

Then, all the designated bits along the projection line may be concatenated to form a codeword, denoted Enhanced-Occupancy map (EOM) codeword hereafter. As illustrated in FIG. 3b, assuming an EOM codeword of 8 bits of length, 2 bits equal 1 to indicate the location of the two 3D samples $P_{i1}$ and $P_{i2}$. Finally, all the EOM codewords may be packed in an image, for example, the occupancy map OM. In that case, at least one patch of the canvas may contain at least one EOM codeword. Such a patch is denoted reference patch and a block of a reference patch is denoted a EOM reference block. Thus, a pixel value of the occupancy map OM may equal to a first value, for example 0, to indicate an unoccupied block of the canvas, or another value, for example greater than 0, to indicate either a occupied block of the canvas, for example when D1−D0<=1, or to indicate a EOM reference block of the canvas when, for example D1−D0>1.

The locations of pixels in the occupancy map OM that indicates EOM reference blocks and the values of the bits of a EOM codeword that are obtained from the values of those pixels, indicate the 3D coordinates of the in-between 3D samples.

In step 3400, a texture image generator TIG may generate at least one texture image TI from the input point cloud frame IPCF, the occupancy map OM, the auxiliary patch information PI and a geometry of a reconstructed point cloud frame derived from at least one decoded geometry image DGI, output of a video decoder VDEC (step 4200 in FIG. 4).

A texture image TI may represent the texture of the input point cloud frame IPCF and may be an image of W×H pixels represented, for example, in YUV420-8 bit format.

The texture image generator TG may exploit the occupancy map information in order to detect (locate) the occupied blocks and thus the non-empty pixels in the texture image.

The texture image generator TIG may be adapted to generate and associate a texture image TI with each geometry image/layer DGI.

According to an embodiment, the texture image generator TIG may code (store) the texture (attribute) values T0 associated with 2D samples of the first layer as pixel values of a first texture image TI0 and the texture values T1 associated with the 2D samples of the second layer as pixel values of a second texture image TI1.

Alternatively, the texture image generating module TIG may code (store) the texture values T1 associated with 2D samples of the second layer as pixel values of the first texture image TI0 and the texture values D0 associated with the 2D samples of the first layer as pixel values of the second geometry image GI1.

For example, colors of 3D samples may be obtained as described in section 2.2.3, 2.2.4, 2.2.5, 2.2.8 or 2.5 of V-PCC.

The texture values of two 3D samples are stored in either the first or second texture images. But, the texture values of in-between 3D samples cannot be stored neither in this first texture image TI0 nor the second texture image TI1 because the locations of the projected in-between 3D samples correspond to occupied blocs that are already used for storing a texture value of another 3D sample (P0 or P1) as illustrated in FIG. 3b. The texture values of in-between 3D samples are thus stored in EOM texture blocks located elsewhere in either the first or second texture image in locations procedurally defined (section 9.4.5 of V-PCC). In brief, this process determines locations of unoccupied blocks in a texture image and stored the texture values associated with in-between 3D samples as pixel values of the unoccupied blocks of the texture image, denoted EOM texture blocks.

According to an embodiment, a padding process may be applied on the geometry and/or texture image. The padding process may be used to fill empty space between patches to generate a piecewise smooth image suited for video compression.

An image padding example is provided in sections 2.2.6 and 2.2.7 of V-PCC.

In step 3500, a video encoder VENC may encode the generated images/layers TI and GI.

In step 3600, an encoder OMENC may encode the occupancy map as an image as detailed, for example, in section 2.2.2 of V-PCC. Lossy or lossless encoding may be used.

According to an embodiment, the video encoder ENC and/or OMENC may be a HEVC-based encoder.

In step 3700, an encoder PIENC may encode the auxiliary patch information PI and possibly additional metadata such as the block size T, the width W and height H of the geometry/texture images.

According to an embodiment, the auxiliary patch information may be differentially encoded (as defined, for example in section 2.4.1 of V-PCC).

In step 3800, a multiplexer may be applied to the generated outputs of steps 3500, 3600 and 3700, and as a result these outputs may be multiplexed together so as to generate a bitstream representative of the base layer BL. It should be noted that the metadata information represents a small fraction of the overall bitstream. The bulk of the information is compressed using the video codecs.

FIG. 4 illustrates a schematic block diagram of an example of an image-based point cloud decoder 4000 in accordance with at least one of the present embodiments.

In step 4100, a de-multiplexer DMUX may applied to demutiplex the encoded information of the bitstream representative of the base layer BL.

In step 4200, a video decoder VDEC may decode encoded information to derive at least one decoded geometry image DGI and at least one decoded texture image DTI.

In step 4300, a decoder OMDEC may decode encoded information to derive a decoded occupancy map DOM.

According to an embodiment, the video decoder VDEC and/or OMDEC may be a HEVC-based decoder.

In step 4400, a decoder PIDEC may decode encoded information to derive auxiliary patch information DPI.

Possibly, metadata may also be derived from the bitstream BL.

In step 4500, a geometry generating module GGM may derive the geometry RG of a reconstructed point cloud frame IRPCF from the at least one decoded geometry image DGI, the decoded occupancy map DOM, the decoded auxiliary patch information DPI and possible additional metadata.

The geometry generating module GGM may exploit the decoded occupancy map information DOM in order to locate the non-empty pixels in the at least one decoded geometry image DGI.

The non-empty pixels belong to either occupied blocks or EOM reference blocks depending on pixels values of the decoded occupancy information DOM and value of D1-D0 as explained above.

According to an embodiment of step 4500, the geometry generating module GGM may derive two of the 3D coordinates of in-between 3D samples from coordinates of non-empty pixels.

According to an embodiment of step 4500, when the non-empty pixels belong to the EOM reference block, the geometry generating module GGM may derive the third of the 3D coordinates of in-between 3D samples from the bit values of the EOM codewords.

For example, according to the example of FIG. 3b, the EOM codeword EOMC is used for determining the 3D coordinates of in-between 3D samples $P_{i1}$ and $P_{i2}$. The third coordinate of the in-between 3D sample $P_{i1}$ may be derived, for example, from D0 by $D_{i1}=D0+3$ and the third coordinate of the reconstructed 3D sample $P_{i2}$ may be derived, for example, from D0 by $D_{i2}=D0+5$. The offset value (3 or 5) is the number of intervals between D0 and D1 along the projection line.

According to an embodiment, when the non-empty pixels belong to an occupied block, the geometry generating module GGM may derive the 3D coordinates of reconstructed 3D samples from coordinates of non-empty pixels, values of the non-empty pixels of one of the at least one decoded geometry image DGI, the decoded auxiliary patch information, and possibly, from additional metadata.

The use of non-empty pixels is based on 2D pixel relationship with 3D samples. For example, with the projection in V-PCC, the 3D coordinates of reconstructed 3D samples may be expressed in terms of depth δ(u, v), tangential shift s(u, v) and bi-tangential shift r(u, v) as follows:

$$\delta(u,v)=\delta0+g(u,v)$$

$$s(u,v)=s0-u0+u$$

$$r(u,v)=r0-v0+v$$

where g(u, v) is the luma component of a decoded geometry image DGI, (u,v) is a pixel associated with a reconstructed 3D sample, (δ0, s0, r0) is the 3D location of a connected component to which the reconstructed 3D sample belongs and (u0, v0, u1, v1) are the coordinates in a projection plane defining a 2D bounding box encompassing the projection of a patch associate with the connected component.

In step 4600, a texture generating module TGM may derive the texture of the reconstructed point cloud frame IRPCF from the geometry RG and the at least one decoded texture image DTI.

According to an embodiment of step 4600, the texture generating module TGM may derive the texture of non-empty pixels that belong to a EOM reference block from a corresponding EOM texture block. The locations of a EOM texture blocks in a texture image are procedurally defined (section 9.4.5 of V-PCC)

According to an embodiment of step 4600, the texture generating module TGM may derive the texture of non-empty pixels that belong to an occupied block directly as pixel values of either the first or second texture image.

Figure 5:
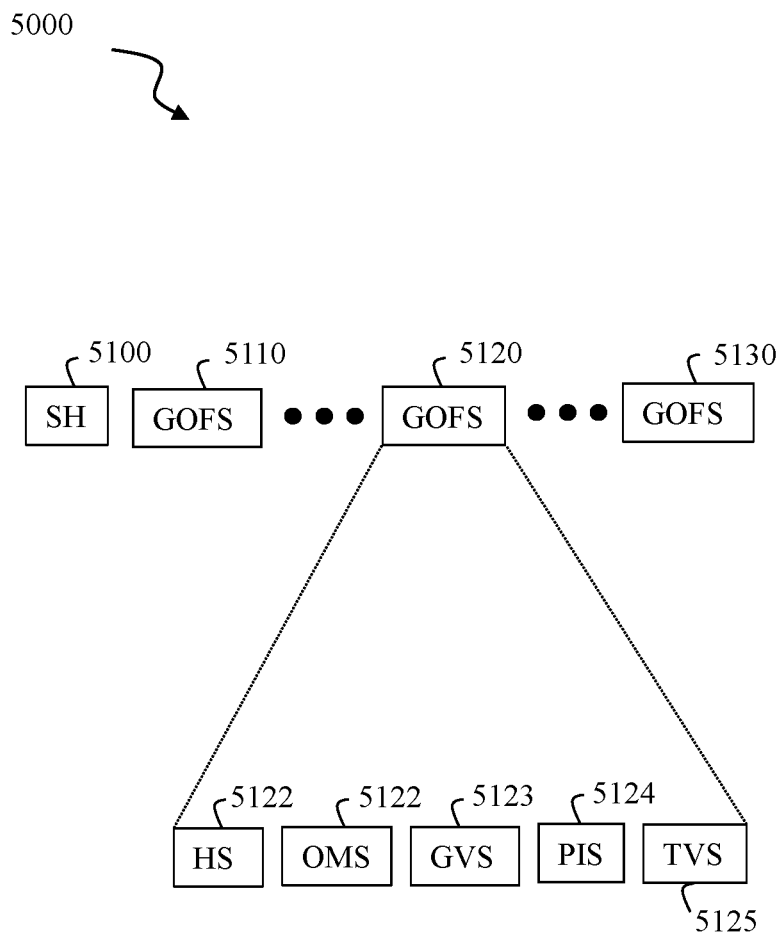
FIG. 5 illustrates schematically an example syntax of a bitstream representative of a base layer BL in accordance with at least one of the present embodiments.

FIG. 5 illustrates schematically an example syntax of a bitstream representative of a base layer BL in accordance with at least one of the present embodiments.

The bitstream comprises a Bitstream Header SH and at least one Group Of Frame Stream GOFS.

A group of frame stream GOFS comprises a header HS, at least one syntax element OMS representative of an occupancy map OM, at least one syntax element GVS representative of at least one geometry image (or video), at least one syntax element TVS representative of at least one texture image (or video) and at least one syntax element PIS representative of auxiliary patch information and other additional metadata.

In a variant, a group of frame stream GOFS comprises at least one frame stream.

Figure 6:
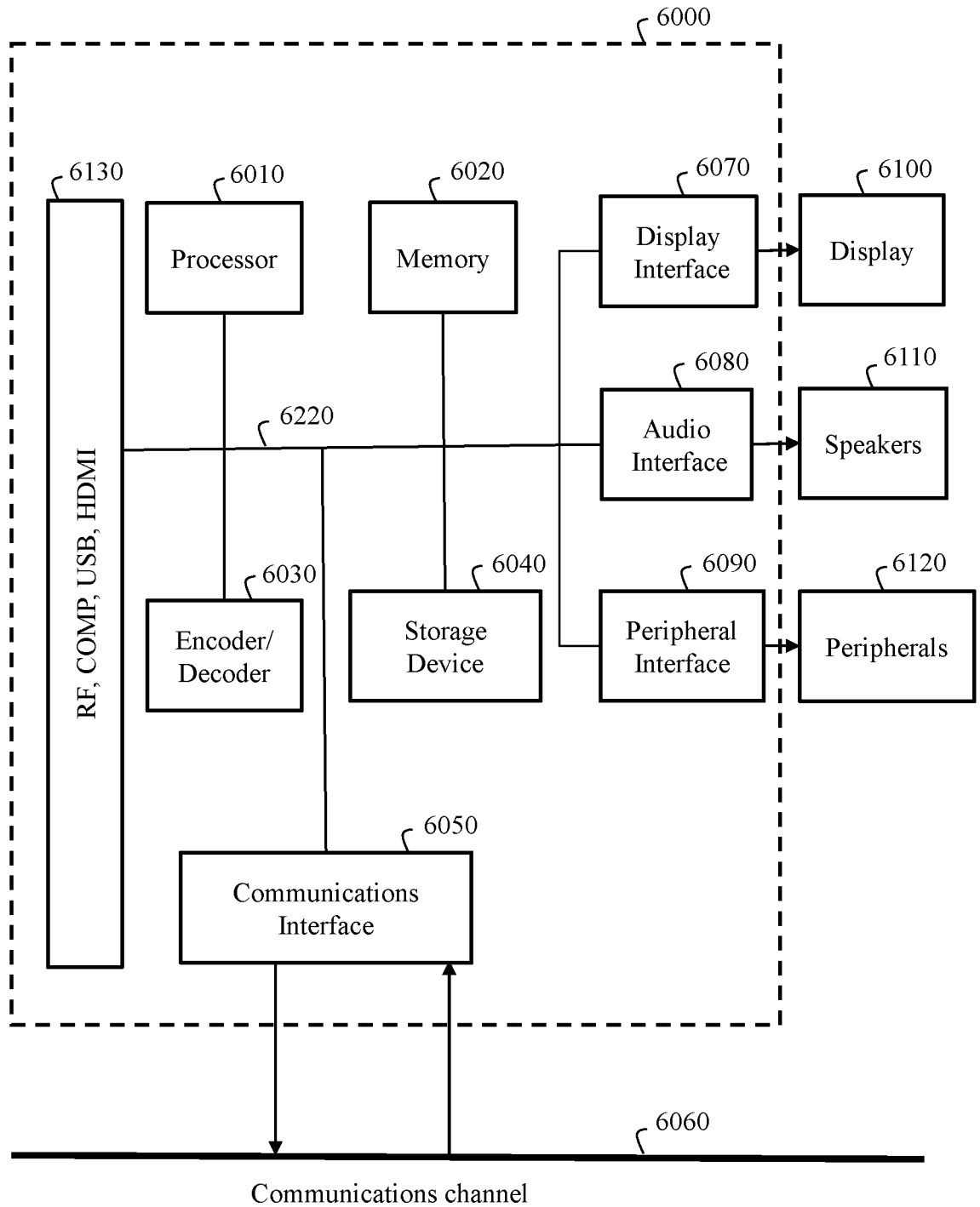
FIG. 6 shows a schematic block diagram illustrating an example of a system in which various aspects and embodiments are implemented.

FIG. 6 shows a schematic block diagram illustrating an example of a system in which various aspects and embodiments are implemented.

System 6000 may be embodied as one or more devices including the various components described below and is configured to perform one or more of the aspects described in this document. Examples of equipment that may form all or part of the system 6000 include personal computers, laptops, smartphones, tablet computers, digital multimedia set top boxes, digital television receivers, personal video recording systems, connected home appliances, connected vehicles and their associated processing systems, head mounted display devices (HMD, see-through glasses), projectors (beamers), "caves" (system including multiple displays), servers, video encoders, video decoders, post-processors processing output from a video decoder, pre-processors providing input to a video encoder, web servers, set-top boxes, and any other device for processing a point cloud, a video or an image or other communication devices. Elements of system 6000, singly or in combination, may be embodied in a single integrated circuit, multiple ICs, and/or discrete components. For example, in at least one embodiment, the processing and encoder/decoder elements of system 6000 may be distributed across multiple ICs and/or discrete components. In various embodiments, the system 6000 may be communicatively coupled to other similar systems, or to other electronic devices, via, for example, a communications bus or through dedicated input and/or output ports. In various embodiments, the system 6000 may be configured to implement one or more of the aspects described in this document.

The system 6000 may include at least one processor 6010 configured to execute instructions loaded therein for implementing, for example, the various aspects described in this document. Processor 6010 may include embedded memory, input output interface, and various other circuitries as known in the art. The system 6000 may include at least one memory 6020 (for example a volatile memory device and/or a non-volatile memory device). System 6000 may include a storage device 6040, which may include non-volatile memory and/or volatile memory, including, but not limited to, Electrically Erasable Programmable Read-Only Memory (EEPROM), Read-Only Memory (ROM), Programmable Read-Only Memory (PROM), Random Access Memory (RAM), Dynamic Random Access Memory (DRAM), Static Random Access Memory (SRAM), flash, magnetic disk drive, and/or optical disk drive. The storage device 6040 may include an internal storage device, an attached storage device, and/or a network accessible storage device, as non-limiting examples.

The system 6000 may include an encoder/decoder module 6030 configured, for example, to process data to provide encoded data or decoded data, and the encoder/decoder module 6030 may include its own processor and memory. The encoder/decoder module 6030 may represent module(s) that may be included in a device to perform the encoding and/or decoding functions. As is known, a device may include one or both of the encoding and decoding modules. Additionally, encoder/decoder module 6030 may be implemented as a separate element of system 6000 or may be incorporated within processor 6010 as a combination of hardware and software as known to those skilled in the art.

Program code to be loaded onto processor 6010 or encoder/decoder 6030 to perform the various aspects described in this document may be stored in storage device 6040 and subsequently loaded onto memory 6020 for execution by processor 6010. In accordance with various embodiments, one or more of processor 6010, memory 6020, storage device 6040, and encoder/decoder module 6030 may store one or more of various items during the performance of the processes described in this document. Such stored items may include, but are not limited to, a point cloud frame, encoded/decoded geometry/texture videos/images or portions of the encoded/decoded geometry/texture video/ images, a bitstream, matrices, variables, and intermediate or final results from the processing of equations, formulas, operations, and operational logic.

In several embodiments, memory inside of the processor 6010 and/or the encoder/decoder module 6030 may be used to store instructions and to provide working memory for processing that may be performed during encoding or decoding.

In other embodiments, however, a memory external to the processing device (for example, the processing device may be either the processor 6010 or the encoder/decoder module 6030) may be used for one or more of these functions. The external memory may be the memory 6020 and/or the storage device 6040, for example, a dynamic volatile memory and/or a non-volatile flash memory. In several embodiments, an external non-volatile flash memory may be used to store the operating system of a television. In at least one embodiment, a fast external dynamic volatile memory such as a RAM may be used as working memory for video coding and decoding operations, such as for MPEG-2 part 2 (also known as ITU-T Recommendation H.262 and ISO/IEC 13818-2, also known as MPEG-2 Video), HEVC (High Efficiency Video coding), or VVC (Versatile Video Coding).

The input to the elements of system 6000 may be provided through various input devices as indicated in block 6130. Such input devices include, but are not limited to, (i) an RF portion that may receive an RF signal transmitted, for example, over the air by a broadcaster, (ii) a Composite input terminal, (iii) a USB input terminal, and/or (iv) an HDMI input terminal.

In various embodiments, the input devices of block 6130 may have associated respective input processing elements as known in the art. For example, the RF portion may be associated with elements necessary for (i) selecting a desired frequency (also referred to as selecting a signal, or band-limiting a signal to a band of frequencies), (ii) down-converting the selected signal, (iii) band-limiting again to a narrower band of frequencies to select (for example) a signal frequency band which may be referred to as a channel in certain embodiments, (iv) demodulating the down-converted and band-limited signal, (v) performing error correction, and (vi) demultiplexing to select the desired stream of data packets. The RF portion of various embodiments may include one or more elements to perform these functions, for example, frequency selectors, signal selectors, band-limiters, channel selectors, filters, downconverters, demodulators, error correctors, and de-multiplexers. The RF portion may include a tuner that performs various of these functions, including, for example, down-converting the received signal to a lower frequency (for example, an intermediate frequency or a near-baseband frequency) or to baseband.

In one set-top box embodiment, the RF portion and its associated input processing element may receive an RF signal transmitted over a wired (for example, cable) medium. Then, the RF portion may perform frequency selection by filtering, down-converting, and filtering again to a desired frequency band.

Various embodiments rearrange the order of the above-described (and other) elements, remove some of these elements, and/or add other elements performing similar or different functions.

Adding elements may include inserting elements in between existing elements, such as, for example, inserting amplifiers and an analog-to-digital converter. In various embodiments, the RF portion may include an antenna.

Additionally, the USB and/or HDMI terminals may include respective interface processors for connecting system 6000 to other electronic devices across USB and/or HDMI connections. It is to be understood that various aspects of input processing, for example, Reed-Solomon error correction, may be implemented, for example, within a separate input processing IC or within processor 6010 as necessary. Similarly, aspects of USB or HDMI interface processing may be implemented within separate interface ICs or within processor 6010 as necessary. The demodulated, error corrected, and demultiplexed stream may be provided to various processing elements, including, for example, processor 6010, and encoder/decoder 6030 operating in combination with the memory and storage elements to process the data stream as necessary for presentation on an output device.

Various elements of system 6000 may be provided within an integrated housing. Within the integrated housing, the various elements may be interconnected and transmit data therebetween using suitable connection arrangement 6140, for example, an internal bus as known in the art, including the I2C bus, wiring, and printed circuit boards.

The system 6000 may include communication interface 6050 that enables communication with other devices via communication channel 6060. The communication interface 6050 may include, but is not limited to, a transceiver configured to transmit and to receive data over communication channel 6060. The communication interface 6050 may include, but is not limited to, a modem or network card and the communication channel 6060 may be implemented, for example, within a wired and/or a wireless medium.

Data may be streamed to the system 6000, in various embodiments, using a Wi-Fi network such as IEEE 802.11. The Wi-Fi signal of these embodiments may be received over the communications channel 6060 and the communications interface 6050 which are adapted for Wi-Fi communications. The communications channel 6060 of these embodiments may be typically connected to an access point or router that provides access to outside networks including the Internet for allowing streaming applications and other over-the-top communications.

Other embodiments may provide streamed data to the system 6000 using a set-top box that delivers the data over the HDMI connection of the input block 6130.

Still other embodiments may provide streamed data to the system 6000 using the RF connection of the input block 6130.

It is to be appreciated that signaling may be accomplished in a variety of ways. For example, one or more syntax elements, flags, and so forth may be used to signal information to a corresponding decoder in various embodiments.

The system 6000 may provide an output signal to various output devices, including a display 6100, speakers 6110, and other peripheral devices 6120. The other peripheral devices 6120 may include, in various examples of embodiments, one or more of a stand-alone DVR, a disk player, a stereo system, a lighting system, and other devices that provide a function based on the output of the system 3000.

In various embodiments, control signals may be communicated between the system 6000 and the display 6100, speakers 6110, or other peripheral devices 6120 using signaling such as AV.Link (Audio/Video Link), CEC (Consumer Electronics Control), or other communications protocols that enable device-to-device control with or without user intervention.

The output devices may be communicatively coupled to system 6000 via dedicated connections through respective interfaces 6070, 6080, and 6090.

Alternatively, the output devices may be connected to system 6000 using the communications channel 6060 via the communications interface 6050. The display 6100 and speakers 6110 may be integrated in a single unit with the other components of system 6000 in an electronic device such as, for example, a television.

In various embodiments, the display interface 6070 may include a display driver, such as, for example, a timing controller (T Con) chip.

The display 6100 and speaker 6110 may alternatively be separate from one or more of the other components, for example, if the RF portion of input 6130 is part of a separate set-top box. In various embodiments in which the display 6100 and speakers 6110 may be external components, the output signal may be provided via dedicated output connections, including, for example, HDMI ports, USB ports, or COMP outputs.

In V-PCC, a geometry smoothing (filtering) is used to remove the aliasing effect caused by possible subsampling of the occupancy map (typically at 4×4 pixel resolution), and to attenuate the effect of encoding errors. More precisely, because the aliasing effect and the encoding errors are most prominent at the boundary (edge) of a patch, a goal of the geometry smoothing is to make the seam between two patches as smooth (seamless) as possible.

Two geometry smoothing methods are used in V-PCC. The first, based on 3D filtering, performs well in terms of quality metrics but is computationally very expensive. The main idea behind the 3D filtering for geometry smoothing is to move the 3D samples (corresponding to 2D samples located close to the boundary of a patch) to the centroid of their nearest neighboring 3D samples. Thus, applying a 3D filtering to a 3D sample 'p' (corresponding to a 2D sample close to the boundary of a patch) is done as follows:

Selecting the N nearest neighboring 3D samples, pn(i), i=0, . . . , N−1, at 3D distance from 'p' smaller than a maximal distance Dmax;

If N is smaller than a minimal values Nmin, then moving to a next 3D sample 'p' (corresponding to a next 2D sample close to the boundary of the patch);

If all neighboring 3D samples pn(i) correspond to 2D samples belonging to the same patch as the current patch to be filtered, then:

Computing the centroid of the neighboring 3D samples pn(i); the centroid being the average of the 3D geometry coordinates of all neighboring 3D samples pn(i); and Moving the 3D sample ' ' to the centroid The second method, (section 2.2.5 of ISO/IEC JTC1/SC29/WG11 MPEG2018/N18017, October 2018, Macau, CN), uses a mix of 2D analysis and 3D processing, which greatly reduces computational complexity but also the quality metrics of the filtered point cloud geometry.

According to a general aspect of at least one embodiment, there is provided a method for smoothing (filtering) the geometry of a point cloud frame by performing an analysis and filtering of the geometry point cloud in a 2D space, without reconstruction of 3D samples in a 3D space, and by using a flexible filtering operator that, in addition to moving existing points, can also remove points or add new ones.

Performing a 2D analysis and filtering, instead of processing 3D samples, greatly reduces computational complexity.

Using a flexible filtering increases the filtering quality.

Thus, the method provides a better trade-off between complexity and filtering quality compared to the existing methods that are either too complex or do not provide adequate filtering capabilities.

Figure 7:
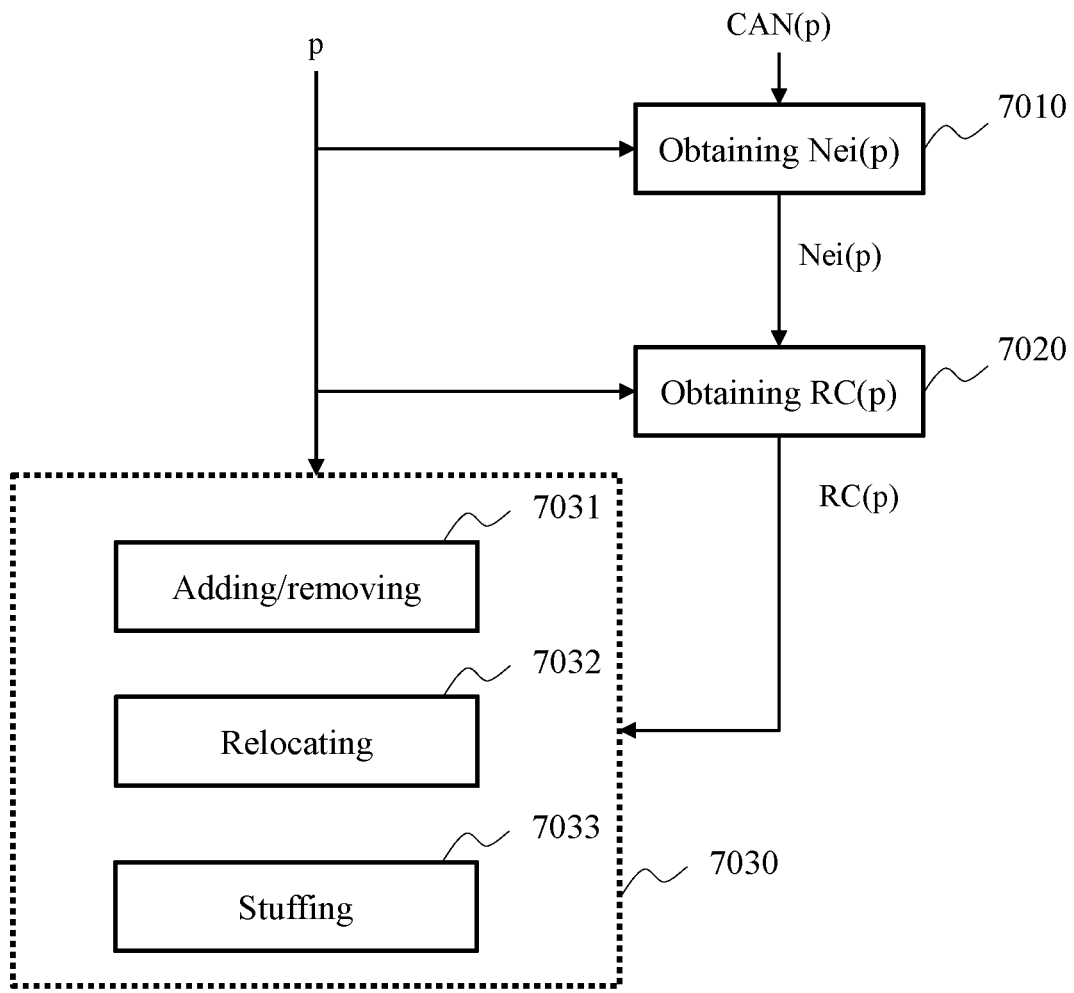
FIG. 7 illustrates a schematic block diagram of a method for filtering the geometry of a point cloud frame in accordance with an example of at least one embodiment.

FIG. 7 illustrates a schematic block diagram of a method for filtering the geometry of a point cloud frame in accordance with an example of at least one embodiment.

A geometry of a point cloud frame is represented by at least one geometry image GI that is generated from the occupancy map and the auxiliary patch information PI as explained above. A canvas, as illustrated in FIG. 3*a*, identifying at least one patch is also used to define the geometry of a point cloud frame. Each patch represents a 2D projection of a connected component along a projection axis as explained above. Modifying the patch on the canvas will modify the geometry of the point cloud frame because the coordinates of 3D samples of the point cloud frame are obtained from the patches, modified or not, of the canvas as explained above.

The method applies steps 7010, 7020 and 7030 to each current patch p of the canvas.

In step 7010, a module may obtain at least one neighboring patch Nei(p) of the current patch p from at least one candidate patch CAN(p).

In the example of FIG. 8*a*, the current patch p is depicted in gray with no outline, whereas candidate patches CAN(p) are marked with a black outline. Candidate patches that are neighbors of the current patch p are depicted in the same gray as the current patch p, and candidate patches that are not neighbors of the current patch are depicted in a lighter gray.

In step 7020, a module may obtain a reference contour RC(p) for the current patch p by re-projecting the 2D samples of the at least one neighboring patch Nei(p) to the projection plane on which the 2D samples of the current patch p have been projected.

First, 3D samples are obtained by inverse-projecting the 2D samples of a neighboring patch Nei (p) according to the projection axis associated with the neighboring patch Nei (p). The projection axis of a patch may be derived from the auxiliary patch information PI. For example, in V-PCC, a projection axis may be derived from 1) information indicating one of the six oriented planes of a 3D bounding box encompassing the 3D samples of a connected component; 2) information relative to the plane normal.

Next, re-projected 2D samples are obtained by projecting the 3D samples along the projection axis associated with the current patch p.

The reference contour RC(p) is then a set of the re-projected 2D samples.

Note that even if re-projecting a 2D sample to a different projection plane requires to inverse-projecting 2D samples to a 3D space and projecting 3D samples to another projection plane, step 7020 does not perform filtering operations in 3D space, hence limiting complexity.

According to a variant of the embodiment of step 7020, only the 2D samples located along the boundary of the neighboring patch Nei(p) may be considered.

For example, 2D samples of a patch is considered as being along the boundary of the patch when the 2D samples are closer than a given threshold to the edge of the patch.

According to a variant of the embodiment of step 7020, only one re-projected 2D sample is kept per location of the canvas.

For example, the kept re-projected 2D sample at a given location is the re-projection 2D sample having a depth closest to the depth a 2D sample of the current patch p located at the location.

Thus, by re-projecting 2D samples of multiple neighboring patches Nei(p) to a same projection plane, the re-projected 2D samples will tend to fall on the true (i.e. original, without encoding errors) positions. When only the 2D samples of the neighboring patches which are located along the boundaries, are projected, those positions are likely to correspond to the true contour between the neighboring patch Nei(p) and the current patch p.

In the example of FIG. 8b, the current patch p is shown (gray) along with the re-projected 2D samples of its four neighboring patches (black lines). Note that the re-projected 2D samples may not form a closed contour.

In step 7030, a module may modify the contour C(p) of the current patch p to fit the reference contour RC(p). The contour C(p) is a set of at least one 2D sample of the current patch p. For example, those 2D samples delimit the current patch p, that is are located along its boundary (edge).

According to an embodiment of step 7010, a candidate patch CAN(p) may be a neighboring patch Nei(p) of the current patch p when 3D samples corresponding to 2D samples of the candidate patch CAN(p) and 3D samples corresponding to 2D samples of the neighboring patch Nei(p) are close to each other.

According to a variant of this embodiment of step 7010, the module may obtain 3D samples by inverse-projecting the 2D samples of the current patch p and the 2D samples of each candidate patch CAN(p). The module then performs a 3D search among all the 3D samples to find a pair of closest 3D samples formed by a 3D sample relative to a 2D sample of the current patch p and a 3D sample relative to a 2D sample of a candidate patch CAN(p).

If a pair of 3D samples fulfilled a neighboring criterion, for example a distance below a threshold, the candidate patch CAN(p) is considered as a neighbor Nei(p) of the current patch p. Otherwise, it isn't.

While this variant is very precise, it is very expensive in terms of computational complexity.

According to a variant of this embodiment of step 7010, the module may determine whether the 3D bounding box of a candidate patch CAN(p) intersects the 3D bounding box of the current patch p: if so, the candidate patch CAN(p) is considered as a neighbor Nei(p) of the current patch p. Otherwise, it isn't.

This variant is not expensive in terms of computational complexity and very easy to use because a 3D bounding box of a patch is defined by the 3D coordinates of its origin (typically corresponding to the bottom, left, front corner) and its width, height and depth. This information is available as part of the auxiliary patch information PI.

According to an embodiment of step 7010, candidate patches may be obtained as follows:

Patch Block Filtering
```
    For all patch p
    |   // Patch Initialization: copy OCM and Geo[0] in patch
    |   For V in [ 0; sizeV0 ]
    |   |   For U in [ 0; sizeV0 ]
    |   |   |   if blockToPatch( U,V ) == patchIndex
    |   |   |   |   copy geometryVideo[0] in patchdephtMap
    |   |   |   |   copy occupancyMapVideo in patchOccupancyMap
    |   dilate depth map
    |   // Generate 3D border points
    |   identifyBoundaryPoints
    |   for all border points
    |   |   generate 3D points
    |   compute 3D bounding box of border points
```

Input:
   Patch list {p}
   Occupancy Map Image (OMI)
   Geometry image of map 0 (GI0)
Output:
   For each patch p, we get CAN(p) with the following information attached to it
      Dilated Geometry Image 0 (UGI0) of all points inside p
      Occupancy Map of all points inside p (OM)
      3D border points
      3D Bounding Box of the 3D border points
Process:
   As input, only depth of occupied points in GI0 is used for optimization purpose but both geometry GI0 and GI1 could be used. Using GI0 only is an optimization in the process, as it avoids the dilatation phase on GI1 which can be time consuming.
   Dilate depth map→propagate depth value of the current point to the "empty space" so we can know the depth of the closest point for any border patches.
   identifyBoundaryPoints→The phase is can be iterative (typically, iteration number equals 2) and allows to identify if a point has to be considered as a boundary patch point.
      1—For each point of the patch, the point is marked as a boundary point if almost one neighbor pixel (top right, bottom, down neighbor pixels) is set unoccupied. We have a list of Identified Boundary Points at the external ring of the patch border, called IBP1.
      2—Redo the same operation on all IBP1 points only to get more point inside the second ring of the patch border. The result is a list of second Identified Boundary Points, called IPB2.
   For all points identified as IBP1 and IBP2, reconstruct the 3D points and compute the corresponding 3D bounding box.
   IBP1 and BP2 are the list of our CAN(p)

According to an embodiment of step 7020, at least one neighboring patch Nei(p) of the current patch p may be obtained from at least one candidate patch CAN(p) as follows:

```
    // Set neighboring patch lists
    For all patches
    |   For all patches de CAN(p)
    |   |   if patches intersect
    |   |   |   add patch in neighboring patch lists
```

Input:
   Patches list
   Candidate patches of previous step Can(p)
Output:
   list of neighbor patches → Nei(p)

Process:
  If bounding box of p and CAN(p) intersects, the CAN(p) is set as Nei(p)
  According to an embodiment of step 7030, in sub-step 7031, the contour C(p) may be modified by adding and/or removing at least one 2D sample of the current patch p.
  As illustrated in FIG. 8c, some areas (at least one 2D sample) of the current patch p may then be removed (top-right) while others may be added (bottom-left) compared to the patch of FIG. 8b. FIG. 8d illustrates the current patch p once modified.
  According to an embodiment of sub-step 7031, the module individually processes all the 2D samples of the contour C(p). Thus, for each 2D sample of the contour C(p):
    If 2D sample of the contour C(p) is outside the reference contour RC(p), the module erodes such 2D sample removing it from the current patch p, then marks its neighboring 2D samples as 2D samples of the contour C(p) and recursively processes them; and
    If the 2D sample of the contour C(p) is inside the reference contour RC(p), the module dilates such 2D sample, then marks newly additional 2D samples as 2D samples of the contour C(p) and recursively processes them.
  FIG. 9 illustrates an example of contour fitting by recursively eroding/dilating 2D samples of a contour C(p) based on their locations with respect to the reference contour RC(p).
  On the left, the result of an initial iteration is shown: the lattice represents a portion of the canvas, where white squares represent empty locations, gray squares represent 2D samples of contour C(p), and black squares represent 2D samples of the reference contour RC(p). 2D samples marked as 'E' are eroded, i.e. removed; 2D samples marked as 'D' are dilated, i.e. neighboring, empty locations are filled with new 2D samples.
  In the middle, the result of a second iteration is shown whereas the result of a final iteration is shown on the right.
  According to a variant of this embodiment of sub-step 7031, only the 2D sample of the contour C(p) outside the reference contour RC(p) are processed. That is 2D samples can be removed but cannot be added.
  According to a variant of this embodiment of sub-step 7031, only the 2D sample of the contour C(p) inside the reference contour RC(p) are processed. That is 2D samples can be added but cannot be removed).
  According to a variant of the embodiment of sub-step 7031, illustrated in FIG. 10, the module determines if a 2D sample of the contour C(p) is inside or outside the reference contour RC(p) as follows:
    For each 2D sample 'p' of the contour C(p):
    Compute the normal of the 2D sample 'p', where the normal points towards the outside of the current patch p;
    Compute the tangent to normal of the 2D sample 'p', which splits a local window in two halves;
    Estimate the amount of 2D samples of the reference contour RC(p) in each half of the local window: $C_{in}(p)$, corresponding to the amount of 2D sample of the reference contour RC(p) in the inner half of the local window, and $C_{out}(p)$ corresponding to amount of 2D sample of the reference contour RC(p) in the outer half of the local window;
    If $C_{in}(p)$ is larger than $C_{out}(p)$, then the 2D sample 'p' is outside the reference contour RC(p). Otherwise, the 2D sample 'p' is inside the reference.

In one embodiment, in order to compute the normal of the 2D sample 'p', the following method is used. Other methods, for instance methods using floating point arithmetic can also be used. The following method can present several advantages for bit accurate systems.

In this method, the 2D normal is computed in a 2D discrete space by analyzing the values of the occupancy map of pixels around the current pixel 'p'. The value of the normal can be one of the following eight possible orientations: 0, 45, 90, 135, 180, 225, 270, 315 degrees. The orientation (normal) for pixel 'p' can be selected based on the distribution of occupied occupancy map pixels in a 3×3 window around the position 'p', for instance, as shown in FIG. 13. In order to further simplify the computation of the normal, the orientation can be directly obtained from a pre-computed look-up table. The index to the loop-up table is based on the combination of the occupancy map value of the eight neighboring pixels of pixel 'p'. The index IDX can be computed as follows:

```
#define IDX( tl, t, tr, l, v, r, bl, b, br )  \
  ( ( tl << 7 ) | ( t << 6 ) | ( tr << 5 ) | ( l << 4 ) |
    ( r << 3 ) | ( bl << 2 ) | ( b << 1 ) | ( br      ) )
``` where tl is a top left pixel, t a top pixel, tr is a top right pixel, l is a left pixel, r is a right pixel, bl is a bottom left pixel, b a bottom pixel and br is a bottom right. The index IDX is defined in [0;255] and can be directly used to access the LUT of pre-computed normal values. The LUT of normal values is defined as follows:

```
static const std::vector<uint8_t> g_orientation =
{  0, 0, 6, 0, 0, 0, 0, 0, 0, 6, 4, 0,
0, 5, 0, 0, 0, 5, 0, 0, 0, 0, 0, 0, 7, 7, 0, 0, 0, 0, 0, 0, 0, 6, 0, 0, 0, 0, 0, 0,
0, 0, 0, 4, 0, 5, 0, 0, 0, 5, 0, 0, 0, 0, 0, 0, 7, 0, 0, 0, 0, 0, 0, 0, 0, 5, 2, 0,
0, 0, 0, 0, 0, 0, 0, 0, 0, 0, 0, 0, 0, 0, 0, 0, 0, 0, 0, 0, 0, 0, 0, 0, 0, 0, 0, 0,
0, 0, 0, 0, 0, 0, 0, 0, 0, 0, 3, 3, 0, 4, 3, 0, 0, 5, 0, 0, 0, 0, 0, 0, 0, 0, 0, 0,
0, 0, 0, 0, 0, 0, 0, 0, 0, 0, 0, 0, 0, 0, 0, 0, 0, 0, 5, 0, 0, 0, 0, 0, 0, 0, 0, 0,
7, 7, 0, 0, 0, 0, 0, 0, 0, 7, 0, 0, 0, 0, 0, 0, 0, 0, 0, 0, 0, 0, 0, 0, 0, 0, 0, 0,
0, 0, 0, 0, 0, 0, 0, 0, 0, 0, 0, 0, 0, 0, 6, 0, 0, 0, 0, 0, 0, 0, 0, 0, 0, 0, 0, 0,
0, 0, 1, 1, 0, 0, 1, 0, 0, 7, 0, 0, 0, 0, 0, 0, 0, 2, 0, 0, 0, 0, 0, 0, 0, 3, 3,
0, 3, 0, 0, 0, 4, 1, 0, 0, 0, 1, 0, 1, 0, 2, 3, 0, 0, 1, 2, 0, 0};
```

In this case, the computation of the discrete normal 'n' can be directly performed for all 2D contour points as follows:

```
int8_t n = g_orientation[ IDX(  p[c - w - 1], p[c - w], p[c - w + 1],
                                p[c - 1], p[c], p[c + 1],
                                p[c + w - 1], p[c + w], p[c + w + 1] ) ];
```

In order to estimate the amount of 2D samples of the reference contour RC(p) (black squares in FIG. 10) inside a given half of the local window, several methods may be used.

According to an embodiment, the amount of 2D samples of the reference contour RC(p) is the number of 2D samples of the reference contour RC(p) inside the given half, regardless of their locations According to an embodiment, the amount of 2D samples of the reference contour RC(p) is a weighted sum that takes into account the location of each 2D sample of the reference contour RC(p) with respect to the current 2D sample 'p':

$$C_{in}(p) = \sum_{r \in W} \frac{1}{d(r, p)}$$

where 'r' denotes a 2D sample of the reference contour RC(p) in the given half window, W denotes the number of 2D samples 'r' and d(.,.) denotes the Euclidean distance between a current 2D sample 'r' and a 2D sample 'p'.

According to an embodiment of sub-step 7030, the module may obtain a parametrized modeling curve of the contour C(p) and a parametrized modeling curve of the reference contour RC(p), and the contour C(p) may be modified by adjusting the parameters of the parametrized modeling curve of the contour C(p) so that it fits over the parametrized modeling curve of the reference contour RC(p).

For example, the modeling curve may be a spline.

According to an embodiment of step 7030, in sub-step 7032, the contour C(p) may be modified by relocating (moving) at least one 2D sample of the current patch p along the projection axis of the current patch 'p'.

The objective of this move is to avoid a seam between the 3D samples corresponding to 2D samples of the current patch p and 3D samples corresponding to the neighboring 2D samples of the reference contour RC(p).

FIG. 11 illustrates an example of the embodiment of sub-step 7032.

On the top-hand side, is shown an initial status of the contour C(p), input of step 7032: the lattice represents a portion of the canvas, where white squares represent empty locations, gray squares represent 2D samples of the current patch p, and black squares represent 2D samples of the reference contour RC(p). The depth at each location is also shown as numbers. It can be seen that while the 2D samples of the current patch p (gray squares) are neighbors of 2D samples of the reference contour RC(p) (black squares) in the lattice, their corresponding 3D samples are not necessarily adjacent to them. For example, on the left column, the 2D sample of the current patch p at depth 8 from the canvas is at a distance of 3 (to 11) or 4 (to 12) from the two 3D samples corresponding to its two neighboring 2D samples of the reference contour C(p).

On the bottom-hand side, is shown the result of the filtering, out of the sub-step 7032: Gray squares with black numbers are relocated 2D samples of the current patch p, effectively being closer (in depth) to their respective neighboring 2D samples of the reference contour RC(p).

According to an embodiment, the steps 7020, sub-sets 7031 and 7032 follows the following process:
Input:
  Patches list
  Nei(p) as output of 7010
  3D Border points of Nei(p)
  OM and GEO images
Output:
  OM modified with potential point removed (at least the same one or a one with removed points)
Process:
In the followed process, #lines represent an implementation optimization. It avoids the computation of the distance of the current depth of all points of all Nei(p) since it projects the nearest point and store the corresponding depth in the depth map.
Do iteratively, for all points of the border point:
  Computing the number of neighbors considering neighbor pixel (top right, bottom, down neighbor pixels)
  a simple step is used to remove quickly a point when no neighbor point is found in the local window (left top bottom right)
  If number of neighbors is less than 4, do as in the European patent application no 19305361.8 filed on Mar. 22, 2019.

As a variant, in sub-step 7031, eroding or dilating 2D sample of the contour C(p) may be done.

```
// Smoothing
For all patches
|   // Build neighbor Depth
#   For all neighboring patch Nei(p)
#   |   For all 3D border points
#   |   |   if point is in the current patch bounding box
#   |   |   |   project 3D point in 2D patch space (x, y, z) => (u, v, d)
#   |   |   |   store depth of the nearest points in the depth Map
|   For iter in [0; filteringSize [
|   |   For each 2D point with ocm equal to 1
|   |   |   Count the number of patch points in the neighborhood of the current point (left,top,right,botton points with ocm equal to 1)
|   |   |   if number of neighbors is 0
|   |   |   |   remove point (set ocm to 0)
|   |   |   if number of neighbors is less than 4
|   |   |   |   Compute contour orientation based on the ocm
|   |   |   |   for all point in the orientation of the local window of size [localWindowSizeX; localWindowSizeY]
|   |   |   |   |   Find the closest border point of the neighborhood patches projected in the same uv position
|   |   |   |   |   if exist
|   |   |   |   |   |   sum the 3D distance between the current point and the closest point of the neighbor patches
|   |   |   |   |   |   sum the 3D distance between the erode point and the closest point of the neighbor patches
|   |   |   |   |   if sum of the current points is superior to the sum computed with the erode point
|   |   |   |   |   |   remove point ( set ocm to 0 )
```

According to an embodiment, parameters of the smoothing may be obtained as follow:

```
occPrecDefault = 2;
filteringSizeDefault = 1;
localWindowSizeXDefault = 2;
localWindowSizeYDefault = 1;
stuffingSizeDefault = 2;
if (OccPrec is equal to occPrecDefault) {
    filteringSize = filteringSizeDefault;
    LocalWindowSizeX = localWindowSizeXDefault;
    LocalWindowSizeY = localWindowSizeYDefault;
    stuffingSize = stuffingSizeDefault;
} else if (OccPrec is equal to occPrecDefault * n) {
    filteringSize = filteringSizeDefault * n;
    LocalWindowSizeX = localWindowSizeXDefault * n;
    LocalWindowSizeY = localWindowSizeYDefault * n;
    stuffingSize = stuffingSizeDefault * n
}
```

Where:

| | |
|---|---|
| OccPrec | is the occupancy precision to which the occupancy map is coded. Typically for lossy coding OccPrec is set to 2 or 4 regarding the bitrate expected. |
| n | is a multiple of 2 for the occupancy precision |
| filteringSize | is the size of the filtering (i.e. number of iterations in the erode/dilate methods). |
| [LocalWindowSizeX, LocalWindowSizeY] | is the half size of the local window in step 7020, means the real size of the local window is [5,3] when OccPrec is 2 or [9;5]when OccPrec is 4 as it includes the current point. |
| stuffingSize | is the threshold distance to which the stuffing operation is done. |

According to an embodiment of step 7030, in sub-step 7033, the contour C(p) may be modified by adding at least one additional 3D sample between 3D samples corresponding to 2D samples of the current patch p and 3D samples corresponding to 2D samples of the reference contour RC(p).

This embodiment allows filling gaps between these 3D samples.

Adding the at least one additional 3D sample involves adding at least one 2D sample in the current patch p but the locations of the at least one 2D sample is already occupied by another 2D sample of the current patch p.

According to an embodiment, a same 2D sample of the current patch p correspond to a 3D sample and to at least one additional 3D sample, the depth value of the at least one additional 3D sample being obtained by linearly interpolation depth values of at least two 3D samples.

According to another embodiment the geometry-based stuffing method described in the international application no PCT/IB19/050492 is used for adding at least one additional 3D sample.

According to an embodiment, the contour orientation may be considered to add stuffed 3D points towards the external and/or inside border of the patch.

FIG. 12 illustrates an example of the embodiment of sub-step 7033.

On the top-hand side, is shown the left column of the lattice of left-hand side of FIG. 11 and a plot of the 2D samples on the canvas (2D coordinate) and along the projection axis (depth). As shown, a seem (void) between 3D samples corresponding to 2D samples of the current patch p (gray squares) and 3D samples corresponding to 2D samples of the reference contour RC(p) (black squares), may occur when scanning along the projection axis.

In the middle, is shown the left column of the lattice of right-hand side of FIG. 11 (output of sub-step 7032) and a plot of the 2D samples on the canvas (2D coordinate) and along the projection axis (depth).

On the bottom-hand side, is shown the result of the filtering, output of sub-step 7033, when the locations of the two new additional 3D samples (dotted squares) has been linearly interpolated from the locations of a pair of existing 3D samples with a depth difference larger than T, a threshold that may be fixed or signaled in the bitstream.

For example, T=1.

According to this sub-step 7033, an additional 3D sample may be created directly in 3D and therefore does not have a corresponding location in the canvas to code its color information (texture).

According to an embodiment of sub-step 7033, the module obtains the color information of at least one additional 3D sample by interpolating the color information of at least two 3D samples.

According to a variant, the at least two 3D samples have their color information coded in the bitstream.

According to a variant, the at least two samples are the two 3D samples used for obtaining the depth value of at least one additional 3D sample.

According to an embodiment of sub-step 7033, the module encodes the color information of at least one additional 3D sample in an unoccupied block in a texture image, using, for example, the same approach as EOM codeword.

According to an embodiment of sub-step 7033, the module encodes the color information of at least one additional 3D sample as a EOM texture patch as described in the European patent application no 19305341.0.

The sub-steps 7031, 7032 and 7033 complement each other but they can also be used independently. FIG. 7 shows an example of embodiment of the method, but these variants may exclude one or any combination of them.

The method of FIG. 7 makes use of several parameters to adjust its behavior. Such parameters may be signaled in a bitstream in a similar way as the current V-PCC specification signals the parameters of the current geometry smoothing filter (see "geometry smoothing" parameters in section 7.3.18 of V-PCC).

In addition, one or more aspects of the present embodiments relate to smoothing or filtering of one or more attributes such as a color attribute of a 3D point cloud or 3D reconstructed points in the 2D space rather than in the more costly 3D space (e.g., using a 3D grid as described below).

One of the approaches used in the state of the art to achieve good compression efficiency when coding point clouds consists on projecting multiple geometry and texture attribute information onto the same position (pixel) of the 2D image. That is, coding several layers of information per input point cloud. Typically, two layers are considered. This means that several 2D geometry and/or 2D texture attribute images are generated per input point cloud. In some embodiments, two depth (for geometry) and color (for texture) images are coded per input point cloud.

Attribute Smoothing (in 3D Domain)

The attributes (e.g., color) of two near 3D points coming from two different patches may have significantly different color due to the quantization stage of attributes in video coding with an impact on visual quality (impairment). For this reason, a 3D color smoothing process has been introduced in V-PCC aiming at smoothing attributes of the 3D points detected as 2D patch borders. Basically, this process computes the average color of some selected points around itself.

One version of this 3D attribute smoothing process (called 3D color smoothing) computes an average attribute value with a KD-tree. The process then searches the N-neighbor 3D points around the current point to compute the attribute value centroid (e.g., average color). Then, a process (named 3D color grid smoothing) uses a 3D grid to compute the average attribute value of each of the 3D 8×8×8 cells and interpolates the average attribute value of each border point by computing a trilinear filtering on the 3D grid.

An example of a 3D color grid geometry smoothing is shown in FIG. 14 and as to be described herewith. The 3D color grid geometry smoothing consists of three main stages:
1) color attribute centroid grid generation;
2) identification of boundary points; and
3) 3D grid color attribute smoothing.

One or more aspects of the present embodiments provide improvements and advantages to these stages and in particular, to the 3D grid color attribute smoothing stage as described herewith.

Color Attribute Centroid Grid Generation Stage

An example of this stage is described in, e.g., clause 9.6.3.2—"Identification of the attribute center grid" of V-PCC:

Inputs to this process are:
    an array containing reconstructed positions, RecPcGeom [i], $0 \le i <$ PointCnt,
    aIdx, the attribute index,
    an array containing reconstructed attributes, RecPcAttr [aIdx][i], $0 \le i <$ PointCnt, and
    numComps, indicating the number of attribute components.

Outputs of this process are:
  an array containing reconstructed center grid attribute values, attrCenterGrid[i][k], 0≤i<numCells and k=0 to numComps−1, inclusive,
  an array containing reconstructed center grid mean luma values, meanLuma[i], 0≤i<numCells, and
  an array containing reconstructed center grid luma median values, attrMean[i][k], 0≤i<numCells and k=0 to numComps−1, inclusive.

attrCenterGrid[x][y][z][m], meanLuma[x][y][z] are initialized to 0 for all x, y and z in the range of 0 to (numCells−1), inclusive and m in the range of 0 to numComps−1, inclusive. Clause 9.6.3.1 is applied to obtain the arrays cellDoSmoothing[x][y][z], cellCnt[x][y][z], cellPatchIdx[x][y][z] for all x, y and z in the range of 0 to (numCells−1), inclusive.

For i=0; to (PointCnt−1) inclusive, the following applies:
  The variables xIdx, yIdx, and zIdx are derived as follows:
    xIdx=(RecPcGeom[i][0]/GridSize)
    yIdx=(RecPcGeom[i][1]/GridSize)
    zIdx=(RecPcGeom[i][2]/GridSize)
  If cellDoSmoothing[xIdx][yIdx][zIdx] is equal to 1, the following applies:
    for(k=0; k<numComps; k++)
      attrCenterGrid[xIdx][yIdx][zIdx][k]+=RecPcAttr[aIdx][i][k];

If cellCnt[x][y][z] is greater than 0 for x, y, z in the range 0 to (numCells−1), inclusive, the mean and median luma values of attribute with index aIdx, for points belonging to that cell are calculated and assigned to arrays meanLuma[x][y][z] and medianLuma[x][y][z], respectively. Also, the luma value of attrCenterGrid is assigned to centroidLuma[x][y][z].

In case of color attribute, determine the luma value corresponding to attribute value, attrValue[k], 0≤k<3, as follows:

lumaValue=0.2126*RecPcAttr[aIdx][0]+
0.7152*RecPcAttr[aIdx][1]+0.0722*RecPcAttr[aIdx][2];

meanLuma[xIdx][yIdx][zIdx]+=lumaValue;

Derive attribute center grids.
  for(k=0; k<numComps; k++)
    attrCenterGrid[xIdx][yIdx][zIdx][k]=attrCenterGrid[xIdx][yIdx][zIdx][k]/cellCnt[xIdx][yIdx][zIdx]

meanLuma[xIdx][yIdx][zIdx]=meanLuma[xIdx][yIdx][zIdx]/cellCnt[xIdx][yIdx][zIdx]

Identification of Boundary Points

An example of this stage is described in, e.g., clause 9.6.4 "Identification of Boundary Points" of V-PCC:

Inputs to this process are:
  an occupancy map frame oFrame
  patch index information from the active geometry_patch_parameter_set Output to this process is:
  a container recPCBoudanyPointType for holding the list of the patch boundary type for the reconstructed point cloud.

A variable BoundaryPointType identifies if a point is located near a patch boundary. The BoundaryPointType may take values in the range of 0 to 1, inclusive. A BoundaryPointType value of 0 indicates that a point is not near a patch boundary. A two-dimensional (asps_frame_width)*(asps_frame_height) array BPTypes stores the BoundaryPointType values for each point in the projected point cloud frame.

A one-dimensional list recPCBoundaryPointType stores the BoundaryPointType for each point (x, y) in the projected point cloud frame for which the value of oFrame[y][x] is not equal to 0. BoundaryPointType values are assigned to BPTypes[y][x] and recPCBoundaryPointType as follows:

```
pointIndex = 0;
for( x = 0; x < asps_frame_width; x++ )
    for( y = 0; y < asps_frame_height; y++ ) {
        BPTypes[ y ][ x ] = 0
        recPCBoundaryPointType[ pointIndex ] = 0
        if( oFrame[ y ][ x ] != 0 )
            if( ( oFrame[ y ][ x - 1 ] == 0 ) || ( oFrame[ y ][ x + 1 ] == 0 ) ||
                ( oFrame[ y - 1 ][ x ] == 0 ) || ( oFrame[ y + 1 ][ x ] == 0 ) ||
                ( oFrame[ y - 1 ][ x - 1 ] == 0 ) || ( oFrame[ y - 1 ][ x + 1 ] == 0 ) ||
                ( oFrame[ y + 1 ][ x - 1 ] == 0 ) || ( oFrame[ y + 1 ][ x + 1] == 0 ) ) {
                    recPCBoundaryPointType[ pointIndex ] = 1
                    BPTypes[ y ][ x ] = 1
            }
        if( ( oFrame[ y ][ x ] != 0) && (recPCBoundaryPointType[ pointIndex ] != 1 ) )
            if( ( oFrame[ y - 2 ][ x - 2 ] == 0 ) || ( oFrame[ y - 2 ][ x - 1 ] == 0 ) ||
                ( oFrame[ y - 2 ][ x ] == 0 ) || ( oFrame[ y - 2 ][ x + 1] == 0 ) ||
                ( oFrame[ y - 2 ][ x + 2 ] == 0 ) || ( oFrame[ y - 1 ][ x - 2 ] == 0 ) ||
                ( oFrame[ y - 1 ][ x + 2 ] == 0 ) || ( oFrame[ y ][ x - 2 ] == 0 ) ||
                ( oFrame[ y ][ x + 2 ] == 0 ) || ( oFrame[ y + 1 ][ x - 2 ] == 0 ) ||
                ( oFrame[ y + 1 ][ x + 2 ] == 0 ) || ( oFrame[ y + 2 ][ x - 2] == 0 ) ||
                ( oFrame[ y + 2 ][ x - 1 ] == 0 ) || ( oFrame[ y + 2 ][ x ] == 0 ) ||
                ( oFrame[ y + 2 ][ x + 1 ] == 0 ) || ( oFrame[ y + 2 ][ x + 2 ] == 0 ) )
                    recPCBoundaryPointType[ pointIndex ] = 1
        pointIndex++
    }
```

In the above assignment process, if (x−2) or (x+2) is outside the range of 0 to asps_frame_width−1, inclusive, or (y−2) or (y+2) is outside the range of 0 to asps_frame_height−1, inclusive, the values of BPTypes[y][x] and recPCBoundaryPointType[pointIndex] are assumed to be equal to 1.

3D Grid Color Attribute Smoothing

FIG. 15 provides an illustration of this stage. As shown in FIG. 15, the average attribute value of each of the 3D 8×8×8 cells is determined. Then the average attribute value of each border point is interpolated by computing a trilinear filtering on the 3D grid.

Another example of this stage is described in, e.g., clause 9.6.4 "Identification of Boundary Points" of V-PCC:

This process is invoked when afp_attribute_smoothing_enabled_flag[aIdx] is equal to 1, where aIdx is the attribute index.
Inputs to this process are:
   an occupancy map corresponding to the current point cloud frame at nominal resolution, oFrame,
   an attribute index, aIdx,
   number of components, numComps, corresponding to the attribute index aIdx,
   an attribute smoothing control parameter set, afp_attribute_smoothing_grid_size[aIdx], afp_attribute_smoothing_threshold[aIdx], afp_attribute_smoothing_threshold_local_entropy[aIdx], afp_attribute_smoothing_threshold_variation[aIdx], and afp_attribute_smoothing_threshold_difference[aIdx]
   an array containing reconstructed attribute values for attribute index aIdx, RecPcAttrSmIn[aIdx][i][j], 0≤i<PointCnt, 0≤j<numComps,
   an array containing reconstructed (possibly smoothed) reconstructed positions, RecPcGeomSmOut[i][j], 0≤i<PointCnt, 0≤j≤2, and
   patch index information corresponding to each point in RecPcGeomSmOut
Output of this process is:
   an array containing reconstructed smoothed attribute values for attribute index aIdx, RecPcAttrSmOut[aIdx][i][j], 0≤i<PointCnt, 0≤j<numComps.
The variable GridSize is set to AttributeSmoothingGridSize[aIdx].
Number of cells, numCells, and the arrays of attrCenterGrid[i] and cellDoSmoothing[x][y][z], for i=0 to numCells−1, inclusive, are derived as described in 9.6.3.2:
   for i=0 to (PointCnt−1), inclusive, the following applies:
      otherClusterPtCnt is set equal to 0.
To determine the points at the patch boundary, clause 9.6.4 is invoked to produce an array recPCBoundary[idx], 0≤idx<PointCnt, which identifies whether each point from RecPcGeomSmOut is a boundary point.
for i=0 to (PointCnt−1), inclusive, the following applies:
   If recPCBoundary[i] is equal to 1 the following steps are performed:

Variables pointGeom[j], j in the range of 0 to 2, inclusive, and pointAttr[k], k in the range of 0 to (numComps−1), inclusive, are defined as follows:

```
for( j = 0; j < 3 ; j++ )
    pointGeom[ j ] = RecPcGeomSmOut[ i ][ j ]
for( k = 0; k < numComps ; k++ )
    pointAttr[ k ] = RecPcAttrSmIn[ aIdx ][ i ][ k ]
``` sub clause 9.6.5 is applied to derive:
   a 2×2×2 grid neighbourhood corresponding to the current position, pointGeom[i]
   the top-left corner of 2×2×2 grid, s[i],
   the 2×2×2 grid position associated with the current position, t[i], i=0 to 2, inclusive
   a boolean value otherClusterPtCn
If otherClusterPtCnt is equal to 1, the following applies:
   The variation of attribute in the 2×2×2 cell neighbourhood of the current cell is determined as follows:
      The isOriginalCell array for the 2×2×2 cell neighbourhood is determined as follows:

```
for( dx = 0; dx < 2; dx++ )
for( dy = 0; dy < 2; dy++ )
for( dz = 0; dz < 2; dz++ ) {
xIdx = s[ 0 ] + dx
yIdx = s[ 1 ] + dy
zIdx = s[ 2 ] + dz
if( ( xIdx == t[0] ) && ( yIdx == t[1] ) && ( zIdx == t[2] ) ) {
    isOriginalCell[ dx ][ dy ][ dz ] = 1
    for( k=0; k < numComps; k++ )
        currAttr[ k ] = pointAttr[ k ]
    if( abs( MeanLuma[ xIdx ][ yIdx ][ zIdx ] − medianLuma[ xIdx ][ yIdx ][ zIdx ] )
            <= afp_attribute_smoothing_threshold_variation[ aIdx ] )
    {
        lumaOrig = centroidLuma[ xIdx ][ yIdx ][ zIdx ]
        for( k=0; k < numComps; k++ )
            attrCentroid[ dx ][ dy ][ dz ][ k ] = attrCenterGrid[ xIdx ][ yIdx ][ zIdx ][ k ]
    }
    else {
        lumaOrig = 0.2126 * currAttr[ 0 ] + 0.7152 * currAttr[ 1 ] + 0.0722 * currAttr[ 2 ]
        for( k=0; k < numComps; k++ )
            attrCentroid[ dx ][ dy ][ dx ][ k ] = currAttr[ k ]
    }
}
else
    isOriginalCell[ dx ][ dy ][ dz ] = 0
}
```

The variation (representative of an activity) in attribute values within a cell and difference between luma centroid values of the original cell and neighboring cells is determined as follows:

```
for( dx = 0; dx < 2; dx++ )
    for( dy = 0; dy < 2; dy++ )
        for( dz = 0; dz < 2; dz++ ) {
            xIdx = s[ 0 ] + dx
            yIdx = s[ 1 ] + dy
            zIdx = s[ 2 ] + dz
            if( isOriginalCell[ dx ][ dy ][ dz ] == 0 )
                if( cellCnt[ xIdx ][ yIdx ][ zIdx ] > 0 ) {
                    for( k=0; k < numComps; k++ )
                        attrCentroid[ dx ][ dy ][ dx ][ k ] =
attrCenterGrid[ xIdx ][ yIdx ][ zIdx ][ k ]
                    lumaN = centroidLuma[ xIdx ][ yIdx ][ zIdx ]
                    diff = abs( lumaOrig − lumaN )
                    var =
meanLuma[ xIdx ][ yIdx ][ zIdx ] − medianLuma[ xIdx ][ yIdx ][ zIdx ]
```

```
            if( ( diff > afp_attribute_smoothing_threshold_difference[
aIdx ] ) ||
                ( abs( var ) > afp_attribute_smoothing_thres-
hold_variation[ aIdx ] ) )
            for( k=0; k < numComps; k++ )
                attrCentroid[ dx ][ dy ][ dx ][ k ] = currAttr[ k ]
        } else {
            for( k=0; k < numComps; k++ )
                attrCentroid[ dx ][ dy ][ dx ][ k ] = currAttr[ k ]
        }
    }
```

An 8-tap trilinear filter as described in 9.6.6 is applied to the attribute centroids, attrCentroid[x][y][z][k] 0≤x, y, z<1, 0≤k<numComps−1, in the 2×2×2 neighborhood is applied:

If the following distortion criteria are satisfied, the output of the tri-linear filter will be added to recPCaSmOut.

The variable distToCentroid2 defined as abs(Ycell−Ycur)*10 is greater than afp_attribute_smoothing_threshold_smoothing[aIdx], where Ycell and Ycur are the luma values of the centroid of points in the current cell (attrCentroid) and the current point (pointAttr), respectively.

Accordingly, one or more aspects of the present embodiments propose a new process or apparatus for smoothing attribute (e.g. color) of 3D reconstructed points of a point cloud. In particular, unlike the 3D color smoothing process as noted above which requires interpolation using 3D grids, the one or more aspects are able to provide color smoothing in a 2D plane to decrease complexity. The one or more aspects compute the color centroids of the patch border points and smooth patch border points based on these centroids in the 2D space. Then the attribute frame is updated before the attribute reconstruction process.

FIG. 16 illustrates one or more aspects of the present color smoothing embodiments which provide new ways to resolve the color problems on patch border.

As already described above, a patch border filtering process projects the border points of the neighbor patches in the 2D patch domain to estimate the connectivity between the patches and corrects the geometry before the reconstruction process. One advantage is that it operates in the 2D domain and is less complex than in 3D.

Similarly, one or more aspects of the present embodiments correct the color of the 3D points before the reconstruction process by computing, for each 2D border point of the patch, the centroid of the color of the points around it (inside the current patch and the neighborhood patches). In this case, the color images are updated before the de-projection from 2D to 3D. The 3D reconstructed points will directly benefit by the reduced complexity color smoothing process in 2D. Hence, the one or more aspects avoid operating color smoothing in 3D.

As shown in FIG. 16, two main processes are proposed:

1. Color Centroid Map/Frame Generation: For each border point of a patch, compute a frame of color centroids as shown in FIGS. 17A and 17B.

2. 2D Color Smoothing: For all previous color centroids, compute a smoothed color centroid with all border points and update attribute frame: update the attribute pixel value with the smoothed color centroid as shown in FIGS. 17A and 17B.

Color Centroid Map/Frame Generation

For each border point of a patch, compute a frame of color centroids as illustrated in FIGS. 17A and 17B.

Another detailed example is illustrated below:

Input:
Attribute color image: AFrame [aIdx][mapIdx][cIdx][y][x], decoded attribute frames at nominal resolution, where mapIdx=0 . . . vpcc_map_count_minus1, y=0 . . . asps_frame_height−1, and x=0 . . . asps_frame_width−1, aIdx=0 . . . ai_attribute_count−1, and cIdx=0 . . . ai_attribute_dimension_minus1[aIdx].

Occupancy image: OFrame [y][x][0], first component of the occupancy map corresponding to the current point cloud frame at nominal resolution, where y=0 . . . asps_frame_height−1, x=0 . . . asps_frame_width−1.

the index of the patch, p.

Output:
Color centroid image: CFrame [aIdx][mapIdx][cIdx][y][x], Frame that contains the color attribute values of the computed centroid, where mapIdx=0 . . . vpcc_map_count_minus1, y=0 . . . asps_frame_height−1, and x=0 . . . asps_frame_width−1, aIdx=0 . . . ai_attribute_count−1, and cIdx=0 . . . ai_attribute_dimension_minus1[aIdx].

*asps—Atlas Sequence Parameter Set (a syntax structure in which parameters are defined).

Process:

```
For all points (u,v) of the occupancy frame OFrame [ u ][v] [0]
    //MODULE Identified boundary points (i.e. if 2D points is border of a patch)
    if(    OFrame[u][v][0] &&
            (! OFrame[u+1][v] [0] ||
            ! OFrame[u−1][v] [0] ||
            !OFrame[u][v−1] [0]||
            ! OFrameu][v+1] [0]))
        //MODULE Attribute Center Generation (Compute the color centroid of the current point and
    store this value in the color centroid frame)
    nbPoints=0;
    for all points (up,vp) in the neighborhood(*) of (u,v) of the same patch index, p
        nbPoints++;
        for aIdx=0..ai_attribute_count − 1,
            for mapIdx=0..vpcc_map_count_minus1,
                for cIdx = 0.. ai_attribute_dimension_minus1[ aIdx ],
                    CFrame          [ aIdx ][ mapIdx ][ cIdx ][ u ][ v ]          +=
        AFrame[ aIdx ][ mapIdx ][ cIdx ][ up ][ vp ]
    for aIdx=0..ai_attribute_count − 1,
        for mapIdx=0..vpcc_map_count_minus1,
            for cIdx = 0.. ai_attribute_dimension_minus1[ aIdx ],
                CFrame [ aIdx ][ mapIdx ][ cIdx ][ u ][ v ] /= nbPoints;
```

```
//MODULE 3D border points generation
Clause 9.4.6 "Reconstruct 3D point position" of [1] (SoTA)
```

(*) The computation of the neighborhood can be done:
  On a rectangular box of size [u−boxSizeU;u+boxSizeU] [v−boxSizeV,v+boxSizeV], typically boxSizeU=4 and boxSizeV=4
  On a circle of around the point(u,v): all point p(up,vp) with condition: sqrt((up−u)^2+(vp−v)^2)<distance, typically distance=5
  On a set of closest points, typically N24-Neighbor Note that the output can be one image for all the patches (same that geo and texture images) or split on several images per patches.

2D Color Smoothing

As illustrated in FIGS. 18A and 18B, for all border points, one or more aspects of a 2D Color smoothing embodiments compute a smoothed color centroid with all border points (with the affected centroid computed in FIGS. 17A and 17B), and update the attribute value with the smoothed color centroid.

FIG. 18B illustrates pictorially one or more aspects of the present 2D color smoothing embodiments. Picture A of FIG. 18B illustrates a point on a reference contour derived as described above (reference contour shown in light grey on the border). Picture B of FIG. 18B illustrates a centroid with a neighboring circle of points for updating the color centroid, with all identified patches boundaries (e.g., BoundaryFrame). Picture C of FIG. 18B illustrates a smoothed color patch after the 2D color smoothing has been applied.

Another example to smooth color may be provided by the following:

Input:
  Occupancy image: OFrame [y][x][0], first component of the occupancy map corresponding to the current point cloud frame at nominal resolution, where y=0 . . . asps_frame_height−1, x=0 . . . asps_frame_width−1. the index of the patch, p.
  Color centroid image: CFrame [aIdx][mapIdx][cIdx][y][x], Frame that contains the color attribute values of the computed centroid, where mapIdx=0 . . . vpcc_map_count_minus1, y=0 . . . asps_frame_height−1, and x=0 . . . asps_frame_width−1, aIdx=0 . . . ai_attribute_count−1, and cIdx=0 . . . ai_attribute_dimension_minus1[aIdx].
  RC(p), reference contour for the patch p by re-projecting the 2D samples of at least one neighboring patch to the projection place.

Output:
  Attribute color image: AFrame [aIdx][mapIdx][cIdx][y][x], updated attribute frames at nominal resolution, where mapIdx=0 . . . vpcc_map_count_minus1, y=0 . . . asps_frame_height−1, and x=0 . . . asps_frame_width−1, aIdx=0 . . . ai_attribute_count−1, and cIdx=0 . . . ai_attribute_dimension_minus1[aIdx].

Process:

```
// MODULE reference contour creation
For each patch
  For each reference contour, RC(p):
    Project the 3D border points in the current patch 2D domain
    Retrieve for each projected point, the associated
    color centroid from CFrame, so that we have the reference
    contour with associated attribute values, ARC(p)
//MODULE Smooth color
```

The module or process for the reference contour creation shown in the above embodiment has already been described extensively. For the smooth color module or process, two additional variations are provided below and as shown respectively in FIG. 19 and FIG. 20.

FIG. 19 illustrates a first variation of the smooth color module or process shown in FIG. 18A. As shown in the process below, for each point (u,v) of the current patch, which are in the boundary area to be filtered (i.e., a point close to the border patch), find the closest point for each ARC(P), if the attribute value of this point is less than a threshold. This value is added to a cumulated centroid value, else the value is discarded. Then, retrieve the mean by dividing the cumulated centroid value by the number of attribute values added and allocate this computed value to the attribute frame (u,v). Equations 1 and 2 below determine the mean/average of centroids.

Another detailed example is illustrated below:

```
For each 2D point (u,v), p, closed to the border of the patch (*)
    nbPoints=0;
    Find the closest 3D point in the ARC(p), q
      If the distance(p,q) < threshold (typically threshold=6)
        nbPoints++;
          centroid[ ai_attribute_count ][ ai_attribute_dimension_minus1 + 1 ] = {0...}
          for aIdx=0..ai_attribute_count − 1,
            for mapIdx=0..vpcc_map_count_minus1,
              for cIdx = 0..ai_attribute_dimension_minus1[ aIdx ],
                centroid[ aIdx ][ cIdx ] + = CFrame [ aIdx ][ mapIdx ][ cIdx ][ up ][ vp ]
(eq.1)
      for aIdx=0..ai_attribute_count − 1,
      if( p == q ) {
    if( abs( CentroidMeanLuma[ q ] − CentroidMedianLuma[ q ] )
         <= afp_attribute_smoothing_threshold_variation[ aIdx ] ) {
      lumaOrig = centroidLuma[ q ]
      for( k=0; k < numComps; k++ )
        attrCentroid[ q ][ k ] = attrCenterGrid [ q ][ k ]
    } else {
      lumaOrig = 0.2126 * pointAttr [ 0 ] + 0.7152 * pointAttr [ 1 ] + 0.0722 * pointAttr [ 2 ]
```

```
    for( k=0; k < numComps; k+ + )
 attrCentroid[ q ][ k ] = pointAttr [ k ]
}
       } else {
          if( CentroidCnt[ q ] > 0 ) {
             for( k=0; k < numComps; k+ + ) {
                  attrCentroid[ q ][ k ] = attrCenterGrid[ q ][ k ]
             lumaN = centroidLuma[ q ]
             diff = abs( lumaOrig - lumaN )
             var = meanLuma[ q ] - medianLuma[ q ]
             if( ( diff > afp_attribute_smoothing_threshold_difference[ aIdx ] ) ||
                 ( abs( var ) > afp_attribute_smoothing_threshold_variation[ aIdx ] ) )
                   for( k=0; k < numComps; k+ + )
                      attrCentroid[ q ][ k ] = pointAttr[ k ]
             } else {
                for( k=0; k < numComps; k+ + )
                   attrCentroid[ q ][ k ] = currAttr[ k ]
             }
          }
       }
    }
 NewAttr = filter( attrCentroid of all q )
 If ( | Ycell - Ycur |* 10 | < threshold_smoothing )
     for aIdx=0..ai_attribute_count - 1,
        for mapIdx=0..vpcc_map_count_minus1,
           for cIdx = 0..ai_attribute_dimension_minus1[ aIdx ],
              AFrame [ aIdx ][ mapIdx ][ cIdx ][ u ][ v ] = NewAttr
``` for mapIdx=0 . . . vpcc_map_count_minus1
for cIdx=0 . . . ai_attribute_dimension_minus1[aIdx],
  AFrame [aIdx][mapIdx][cIdx][u][v]=centroid[aIdx][cIdx]/nbPoints; (eq. 2)

FIG. 20 illustrates another variation of the smooth color module or process shown in FIG. 18A. In this variation, the portion that determines the mean/average of centroids shown in the variation above (highlighted in gray) has been further refined.

As shown in FIG. 20, a point (u,v) of a patch p, the closest centroids belonging to each of the identified boundary patches and whose position is close enough (according to a threshold) to the current de-projected (u,v) point (i.e., a 3D point) is identified and called a Centroid, C.

If C belongs to the current patch, an activity is computed according to a process 1, else the activity is computed according to another process 2. As an example, process 1 corresponds to a difference between an average of the values of the attributes belonging to a centroid determined in the attribute center generation step described above. As an example, process 2 corresponds to process 1 but augmented with the verification that the current luma point and the luma of centroid difference is less than a distance threshold.

If computed activity is low (below a threshold), then centroid of the patch boundary is added to the computation of the filtering. Otherwise, the original attribute of point (u,v) is used in the filtering. The filtering may be an average or an average weighted by the number of points in the neighborhood or an average weighted by the distance between the current point (u,v) and the position of the identified centroids. The filtering is different from the tri-linear filtering mentioned above.

Another detailed example is illustrated below:

For each 2D point (u,v), p, closed to the border of the patch (*)

nbPoints=0;

Find the closest 3D point in the ARC(p), q

If the distance(p,q)<threshold (typically threshold=6)

```
          if( p == q ) {
 if( abs( CentroidMeanLuma[ q ] - CentroidMedianLuma[ q ] )
         < = afp_attribute_smoothing_threshold_variation[ aIdx ] ) {
    lumaOrig = centroidLuma[ q ]
    for( k=0; k < numComps; k+ + )
       attrCentroid[ q ][ k ] = attrCenterGrid [ q ][ k ]
 } else {
    lumaOrig = 0.2126 * pointAttr [ 0 ] + 0.7152 * pointAttr [ 1 ] + 0.0722 * pointAttr [ 2 ]
    for( k=0; k < numComps; k+ + )
 attrCentroid[ q ][ k ] = pointAttr [ k ]
 }
       } else {
          if( CentroidCnt[ q ] > 0 ) {
             for( k=0; k < numComps; k+ + ) {
                attrCentroid[ q ][ k ] = attrCenterGrid[ q ][ k ]
             lumaN = centroidLuma[ q ]
             diff = abs( lumaOrig - lumaN )
             var = meanLuma[ q ] - medianLuma[ q ]
             if( ( diff > afp_attribute_smoothing_threshold_difference[ aIdx ] ) ||
                 ( abs( var ) > afp_attribute_smoothing_threshold_variation[ aIdx ] ) )
                 for( k=0; k < numComps; k+ + )
                    attrCentroid[ q ][ k ] = pointAttr[ k ]
```

```
        } else {
           for( k=0; k < numComps; k++ )
              attrCentroid[ q ][ k ] = currAttr[ k ]
        }
      }
    }
  }
}
NewAttr = filter( attrCentroid of all q )
If ( | Ycell - Ycur |* 10 | < threshold_smoothing )
   for aIdx=0..ai_attribute_count - 1,
      for mapIdx=0..vpcc_map_count_minus1,
         for cIdx = 0..ai_attribute_dimension_minus1[ aIdx ],
            AFrame [ aldx ][ mapidx ][ cidx ][ u ][ v ] = NewAttr
```

FIG. 21 illustrates an example of a process 2100 according to one or more aspects of the present embodiments. At 2110, one or more attributes of a point cloud are represented by a canvas of patches of 2D samples and values of the 2D samples. At 2120, at least one 2D sample of a current patch is modified to fit a reference contour, the reference contour being obtained by re-projecting at least one 2D sample of at least one neighboring patch of the current patch to a projection plane on which the 2D samples of the current patch have been projected. At 2130, the one or more attributes of the point cloud are filtered based on the modified at least one 2D sample of the current patch. Additionally, in one embodiment, the one or more attributes of the point cloud may comprise color information. In yet another embodiment, the one or more attributes of the point cloud may comprise geometric information such as depth information.

In FIGS. 1-21, various methods are described herein, and each of the methods includes one or more steps or actions for achieving the described method. Unless a specific order of steps or actions is required for proper operation of the method, the order and/or use of specific steps and/or actions may be modified or combined.

Some examples are described with regard to block diagrams and operational flowcharts. Each block represents a circuit element, module, or portion of code which includes one or more executable instructions for implementing the specified logical function(s). It should also be noted that in other implementations, the function(s) noted in the blocks may occur out of the indicated order. For example, two blocks shown in succession may, in fact, be executed substantially concurrently or the blocks may sometimes be executed in the reverse order, depending on the functionality involved.

The implementations and aspects described herein may be implemented in, for example, a method or a process, an apparatus, a computer program, a data stream, a bitstream, or a signal. Even if only discussed in the context of a single form of implementation (for example, discussed only as a method), the implementation of features discussed may also be implemented in other forms (for example, an apparatus or computer program).

The methods may be implemented in, for example, a processor, which refers to processing devices in general, including, for example, a computer, a microprocessor, an integrated circuit, or a programmable logic device. Processors also include communication devices.

Additionally, the methods may be implemented by instructions being performed by a processor, and such instructions (and/or data values produced by an implementation) may be stored on a computer readable storage medium. A computer readable storage medium may take the form of a computer readable program product embodied in one or more computer readable medium(s) and having computer readable program code embodied thereon that is executable by a computer. A computer readable storage medium as used herein may be considered a non-transitory storage medium given the inherent capability to store the information therein as well as the inherent capability to provide retrieval of the information therefrom. A computer readable storage medium may be, for example, but is not limited to, an electronic, magnetic, optical, electromagnetic, infrared, or semiconductor system, apparatus, or device, or any suitable combination of the foregoing. It is to be appreciated that the following, while providing more specific examples of computer readable storage mediums to which the present embodiments may be applied, is merely an illustrative and not an exhaustive listing as is readily appreciated by one of ordinary skill in the art: a portable computer diskette; a hard disk; a read-only memory (ROM); an erasable programmable read-only memory (EPROM or Flash memory); a portable compact disc read-only memory (CD-ROM); an optical storage device; a magnetic storage device; or any suitable combination of the foregoing.

The instructions may form an application program tangibly embodied on a processor-readable medium.

Instructions may be, for example, in hardware, firmware, software, or a combination. Instructions may be found in, for example, an operating system, a separate application, or a combination of the two. A processor may be characterized, therefore, as, for example, both a device configured to carry out a process and a device that includes a processor-readable medium (such as a storage device) having instructions for carrying out a process. Further, a processor-readable medium may store, in addition to or in lieu of instructions, data values produced by an implementation.

An apparatus may be implemented in, for example, appropriate hardware, software, and firmware. Examples of such apparatus include personal computers, laptops, smartphones, tablet computers, digital multimedia set top boxes, digital television receivers, personal video recording systems, connected home appliances, head mounted display devices (HMD, see-through glasses), projectors (beamers), "caves" (system including multiple displays), servers, video encoders, video decoders, post-processors processing output from a video decoder, pre-processors providing input to a video encoder, web servers, set-top boxes, and any other device for processing a point cloud, a video or an image or other communication devices. As should be clear, the equipment may be mobile and even installed in a mobile vehicle.

Computer software may be implemented by the processor 6010 or by hardware, or by a combination of hardware and software. As a non-limiting example, the embodiments may be also implemented by one or more integrated circuits. The memory 6020 may be of any type appropriate to the technical environment and may be implemented using any appropriate data storage technology, such as optical memory devices, magnetic memory devices, semiconductor-based memory devices, fixed memory, and removable memory, as non-limiting examples. The processor 6010 may be of any type appropriate to the technical environment, and may encompass one or more of microprocessors, general purpose computers, special purpose computers, and processors based on a multi-core architecture, as non-limiting examples.

As will be evident to one of ordinary skill in the art, implementations may produce a variety of signals formatted to carry information that may be, for example, stored or transmitted. The information may include, for example, instructions for performing a method, or data produced by one of the described implementations. For example, a signal may be formatted to carry the bitstream of a described embodiment. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

The terminology used herein is for the purpose of describing particular embodiments only and is not intended to be limiting. As used herein, the singular forms "a", "an", and "the" may be intended to include the plural forms as well, unless the context clearly indicates otherwise. It will be further understood that the terms "includes/comprises" and/or "including/comprising" when used in this specification, may specify the presence of stated, for example, features, integers, steps, operations, elements, and/or components but do not preclude the presence or addition of one or more other features, integers, steps, operations, elements, components, and/or groups thereof. Moreover, when an element is referred to as being "responsive" or "connected" to another element, it may be directly responsive or connected to the other element, or intervening elements may be present. In contrast, when an element is referred to as being "directly responsive" or "directly connected" to other element, there are no intervening elements present.

It is to be appreciated that the use of any of the symbol/term "/", "and/or", and "at least one of", for example, in the cases of "A/B", "A and/or B" and "at least one of A and B", may be intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as is clear to one of ordinary skill in this and related arts, for as many items as are listed.

Various numeric values may be used in the present application, for example T. The specific values may be for example purposes and the aspects described are not limited to these specific values.

It will be understood that, although the terms first, second, etc. may be used herein to describe various elements, these elements are not limited by these terms. These terms are only used to distinguish one element from another. For example, a first element could be termed a second element, and, similarly, a second element could be termed a first element without departing from the teachings of this application. No ordering is implied between a first element and a second element.

Reference to "one embodiment" or "an embodiment" or "one implementation" or "an implementation", as well as other variations thereof, is frequently used to convey that a particular feature, structure, characteristic, and so forth (described in connection with the embodiment/implementation) is included in at least one embodiment/implementation. Thus, the appearances of the phrase "in one embodiment" or "in an embodiment" or "in one implementation" or "in an implementation", as well any other variations, appearing in various places throughout this application are not necessarily all referring to the same embodiment.

Similarly, reference herein to "in accordance with an embodiment/example/implementation" or "in an embodiment/example/implementation", as well as other variations thereof, is frequently used to convey that a particular feature, structure, or characteristic (described in connection with the embodiment/example/implementation) may be included in at least one embodiment/example/implementation. Thus, the appearances of the expression "in accordance with an embodiment/example/implementation" or "in an embodiment/example/implementation" in various places in the specification are not necessarily all referring to the same embodiment/example/implementation, nor are separate or alternative embodiment/examples/implementation necessarily mutually exclusive of other embodiments/examples/implementation.

Reference numerals appearing in the claims are by way of illustration only and shall have no limiting effect on the scope of the claims. Although not explicitly described, the present embodiments/examples and variants may be employed in any combination or sub-combination.

When a figure is presented as a flow diagram, it should be understood that it also provides a block diagram of a corresponding apparatus. Similarly, when a figure is presented as a block diagram, it should be understood that it also provides a flow diagram of a corresponding method/process.

Although some of the diagrams include arrows on communication paths to show a primary direction of communication, it is to be understood that communication may occur in the opposite direction to the depicted arrows.

Various implementations involve decoding. "Decoding", as used in this application, may encompass all or part of the processes performed, for example, on a received point cloud frame (including possibly a received bitstream which encodes one or more point cloud frames) in order to produce a final output suitable for display or for further processing in the reconstructed point cloud domain. In various embodiments, such processes include one or more of the processes typically performed by an image-based decoder.

As further examples, in one embodiment "decoding" may refer only to entropy decoding, in another embodiment "decoding" may refer only to differential decoding, and in another embodiment "decoding" may refer to a combination of entropy decoding and differential decoding. Whether the phrase "decoding process" may be intended to refer specifically to a subset of operations or generally to the broader decoding process will be clear based on the context of the specific descriptions and is believed to be well understood by those skilled in the art.

Various implementations involve encoding. In an analogous way to the above discussion about "decoding", "encoding" as used in this application may encompass all or part of the processes performed, for example, on an input point cloud frame in order to produce an encoded bitstream. In various embodiments, such processes include one or more of the processes typically performed by an image-based decoder.

As further examples, in one embodiment "encoding" may refer only to entropy encoding, in another embodiment "encoding" may refer only to differential encoding, and in another embodiment "encoding" may refer to a combination of differential encoding and entropy encoding. Whether the phrase "encoding process" may be intended to refer specifically to a subset of operations or generally to the broader encoding process will be clear based on the context of the specific descriptions and is believed to be well understood by those skilled in the art.

Note that the syntax elements as used herein are descriptive terms. As such, they do not preclude the use of other syntax element names.

Various embodiments refer to rate distortion optimization. In particular, during the encoding process, the balance or trade-off between the rate and distortion is usually considered, often given the constraints of computational complexity. The rate distortion optimization may be usually formulated as minimizing a rate distortion function, which is a weighted sum of the rate and of the distortion. There are different approaches to solve the rate distortion optimization problem. For example, the approaches may be based on an extensive testing of all encoding options, including all considered modes or coding parameters values, with a complete evaluation of their coding cost and related distortion of the reconstructed signal after coding and decoding. Faster approaches may also be used, to save encoding complexity, in particular with computation of an approximated distortion based on the prediction or the prediction residual signal, not the reconstructed one. A mix of these two approaches may also be used, such as by using an approximated distortion for only some of the possible encoding options, and a complete distortion for other encoding options. Other approaches only evaluate a subset of the possible encoding options. More generally, many approaches employ any of a variety of techniques to perform the optimization, but the optimization is not necessarily a complete evaluation of both the coding cost and related distortion.

Additionally, this application may refer to "determining" various pieces of information. Determining the information may include one or more of, for example, estimating the information, calculating the information, predicting the information, or retrieving the information from memory.

Further, this application may refer to "accessing" various pieces of information. Accessing the information may include one or more of, for example, receiving the information, retrieving the information (for example, from memory), storing the information, moving the information, copying the information, calculating the information, determining the information, predicting the information, or estimating the information.

Additionally, this application may refer to "receiving" various pieces of information. Receiving is, as with "accessing", intended to be a broad term. Receiving the information may include one or more of, for example, accessing the information, or retrieving the information (for example, from memory). Further, "receiving" is typically involved, in one way or another, during operations such as, for example, storing the information, processing the information, transmitting the information, moving the information, copying the information, erasing the information, calculating the information, determining the information, predicting the information, or estimating the information.

Also, as used herein, the word "signal" refers to, among other things, indicating something to a corresponding decoder. In this way, in an embodiment the same parameter may be used at both the encoder side and the decoder side. Thus, for example, an encoder may transmit (explicit signaling) a particular parameter to the decoder so that the decoder may use the same particular parameter. Conversely, if the decoder already has the particular parameter as well as others, then signaling may be used without transmitting (implicit signaling) to simply allow the decoder to know and select the particular parameter. By avoiding transmission of any actual functions, a bit savings is realized in various embodiments. It is to be appreciated that signaling may be accomplished in a variety of ways. For example, one or more syntax elements, flags, and so forth are used to signal information to a corresponding decoder in various embodiments. While the preceding relates to the verb form of the word "signal", the word "signal" may also be used herein as a noun.

A number of implementations have been described. Nevertheless, it will be understood that various modifications may be made. For example, elements of different implementations may be combined, supplemented, modified, or removed to produce other implementations. Additionally, one of ordinary skill will understand that other structures and processes may be substituted for those disclosed and the resulting implementations will perform at least substantially the same function(s), in at least substantially the same way(s), to achieve at least substantially the same result(s) as the implementations disclosed. Accordingly, these and other implementations are contemplated by this application.

Additional embodiments may include one or more of the following features, devices, or aspects, alone or in any combination, across various claim categories and types:

- Filtering or smoothing one or more attributes of a point cloud in 2D space rather than in 3D space.
- Filtering or smoothing one or more attributes of a point cloud in 2D space using a reference contour of a patch.
- Filtering or smoothing one or more attributes of a point cloud in 2D space based on one or more centroids on a reference contour of a patch.
- A reference contour according to one or more the described embodiments is obtained by re-projecting at least one 2D sample of at least one neighboring patch of a current patch to a projection plane on which the 2D samples of the current patch have been projected.
- Filtering or smoothing one or more attributes of the point cloud according to one or more of the described embodiments is obtained by re-projecting into 3D the filtered one or more attributes in 2D based on the modified at least one 2D sample of the current patch.
- The one or more attributes of a point cloud according to one or more of the described embodiments comprise color information.
- The one or more attributes of a point cloud according to one or more of the described embodiments comprise geometry information such as, e.g., depth information.
- A bitstream or signal that includes one or more of the described syntax elements, or variations thereof.

A bitstream or signal that includes syntax conveying information generated according to any of the embodiments described.

Inserting, into the signaling syntax, elements that enable the decoder to adapt residues in a manner corresponding to that used by an encoder.

Creating and/or transmitting and/or receiving and/or decoding a bitstream or signal that includes one or more of the described syntax elements, or variations thereof.

Creating and/or transmitting and/or receiving and/or decoding according to any of the embodiments described.

A method, process, apparatus, medium storing instructions, medium storing data, or signal according to any of the embodiments described.

A TV, set-top box, cell phone, tablet, or other electronic device that performs adaptation of filter parameters according to any of the embodiments described.

A TV, set-top box, cell phone, tablet, or other electronic device that performs adaptation of filter parameters according to any of the embodiments described, and that displays (e.g. using a monitor, screen, or other type of display) a resulting image.

A TV, set-top box, cell phone, tablet, or other electronic device that selects (e.g. using a tuner) a channel to receive a signal including an encoded image, and performs adaptation of filter parameters according to any of the embodiments described.

A TV, set-top box, cell phone, tablet, or other electronic device that receives (e.g. using an antenna) a signal over the air that includes an encoded image, and performs adaptation of filter parameters according to any of the embodiments described.

The invention claimed is:

1. A method comprising:
   obtaining a patch representative of a geometry of 3D samples of a point cloud frame projected on a first projection plane,
   obtaining at least one neighboring patch of the patch from at least one candidate patch, wherein a candidate patch is a neighboring patch when a 3D bounding box of the candidate patch intersects a 3D bounding box of the patch,
   obtaining a reference contour by re-projecting at least one 2D sample of the at least one neighboring patch of the patch onto the first projection plane, and
   modifying spatially at least one 2D sample of the patch to fit the reference contour.

2. The method of claim 1, wherein the 2D samples of the patch forms a contour of said patch.

3. The method of claim 2, wherein the contour of the patch is modified by adding and/or removing at least one 2D sample of the patch.

4. The method of claim 3, wherein a 2D sample of the contour of the patch is modified if it is either inside or outside the reference contour.

5. The method of claim 2, wherein the contour of the patch is modified by relocating at least one 2D sample of the patch along a projection axis of the patch.

6. The method of claim 2, wherein the contour of the patch is modified by adding at least one additional 3D sample between at least one 3D sample corresponding to a 2D sample of the patch and at least one 3D sample corresponding to a 2D sample of the reference contour.

7. The method of claim 1 further comprising filtering attributes of said 2D samples of the patch.

8. The method of claim 7, wherein attributes of said 2D samples of the patch comprises color information or depth information.

9. The method of claim 1, wherein re-projecting at least one 2D sample of the at least one neighboring patch of the patch onto the first projection plane comprises:
   obtaining 3D samples by inverse-projecting 2D samples of the at least one neighboring patch according to a projection axis associated with the neighboring patch,
   projecting the obtained 3D samples along a projection axis associated with the patch onto the first projection plane.

10. The method of claim 1, wherein the at least one 2D sample of the at least one neighboring patch is a 2D sample located at a boundary of the at least one neighboring patch.

11. The method of claim 1, wherein only one 2D sample re-projected onto the first projection plane is kept per location a canvas of the patch.

12. The method of claim 11, wherein the only one re-projected 2D sample that is kept for a given location is a re-projected 2D sample having a depth that is closest to a depth of a 2D sample of the patch located at the same location.

13. An apparatus comprising one or more processors configured to:
   obtain a patch representative of the geometry of 3D samples of a point cloud frame projected on a first projection plane;
   obtain at least one neighboring patch of the patch from at least one candidate patch, wherein a candidate patch is a neighboring patch when a 3D bounding box of the candidate patch intersects a 3D bounding box of the patch;
   obtain a reference contour by re-projecting at least one 2D sample of the at least one neighboring patch of the patch onto the first projection plane; and
   modify spatially at least one 2D sample of the patch to fit the reference contour.

14. The apparatus of claim 13, wherein the at least one 2D sample of the at least one neighboring patch is a 2D sample located at a boundary of the at least one neighboring patch.

15. The apparatus of claim 13, wherein the 2D samples of the patch forms a contour of said patch.

16. The apparatus of claim 15, wherein the contour of the patch is modified by adding and/or removing at least one 2D sample of the patch.

17. The apparatus of claim 13, wherein attributes of said 2D samples of the patch comprises color information or depth information.

18. A non-transitory computer-readable medium including instructions for causing one or more processors to perform a method according to claim 1.

19. The apparatus of claim 13, wherein re-projecting at least one 2D sample of the at least one neighboring patch of the patch onto the first projection plane comprises:
   obtaining 3D samples by inverse-projecting 2D samples of the at least one neighboring patch according to a projection axis associated with the neighboring patch,
   projecting the obtained 3D samples along a projection axis associated with the patch onto the first projection plane.

* * * * *